United States Patent
Cain et al.

(10) Patent No.: US 6,954,449 B2
(45) Date of Patent: *Oct. 11, 2005

(54) METHOD AND DEVICE FOR ESTABLISHING COMMUNICATION LINKS AND PROVIDING RELIABLE CONFIRM MESSAGES IN A COMMUNICATION SYSTEM

(75) Inventors: Joseph Bibb Cain, Indialantic, FL (US); Thomas Jay Billhartz, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/280,485

(22) Filed: Oct. 25, 2002

(65) Prior Publication Data

US 2003/0214969 A1 Nov. 20, 2003

Related U.S. Application Data

(63) Continuation-in-part of application No. 10/043,457, filed on Jan. 10, 2002.

(51) Int. Cl.[7] .............................. H04B 7/212; H04J 3/00
(52) U.S. Cl. ....................... 370/337; 370/338; 370/339; 370/443
(58) Field of Search ................................ 370/337, 339, 370/349, 442, 443, 338

(56) References Cited

U.S. PATENT DOCUMENTS

| | | | | |
|---|---|---|---|---|
| 5,420,861 A | * | 5/1995 | De La Bourdonnaye | 370/229 |
| 5,487,069 A | * | 1/1996 | O'Sullivan et al. | 370/404 |
| 5,767,807 A | * | 6/1998 | Pritchett | 342/374 |
| 5,777,990 A | * | 7/1998 | Zehavi et al. | 370/335 |
| 6,222,849 B1 | * | 4/2001 | Cornes et al. | 370/437 |
| 6,226,531 B1 | | 5/2001 | Holt et al. | 455/562 |
| 6,278,883 B1 | | 8/2001 | Choi | 455/552 |
| 6,363,062 B1 | * | 3/2002 | Aaronson et al. | 370/348 |
| 6,781,967 B1 | * | 8/2004 | Young | 370/312 |
| 6,798,761 B2 | * | 9/2004 | Cain et al. | 370/337 |
| 6,804,208 B2 | * | 10/2004 | Cain et al. | 370/326 |
| 2002/0080768 A1 | * | 6/2002 | Garcia-Luna-Aceves et al. | 370/349 |
| 2002/0085526 A1 | * | 7/2002 | Belcea | 370/337 |
| 2002/0118661 A1 | * | 8/2002 | Voce | 370/337 |

(Continued)

OTHER PUBLICATIONS

Lott, Matthias, et al; "Medium access and radio resource management for ad hoc networks based on UTRA TDD"; Oct. 2001; ACM Press; Proceedings of the 2nd ACM international symposium on Mobile ad hoc networking computing; pp 76–86.*

(Continued)

*Primary Examiner*—Seema S. Rao
*Assistant Examiner*—Robert C. Scheibel, Jr.
(74) *Attorney, Agent, or Firm*—Allen, Dyer, Doppelt, Milbrath & Gilchrist, P.A.

(57) ABSTRACT

A wireless communication network includes a plurality of mobile nodes each including a transceiver, a phased array antenna connected to the transceiver, and a controller connected to the transceiver. The controller schedules time slots for each time frame to establish a communication link with each neighboring mobile node. An initiating mobile node transmits a request for time slots to the receiving mobile node, which transmits a reply to the initiating mobile node. The initiating mobile node transmits a confirmation to the receiving mobile node, and the receiving mobile node transmits the reply again if the confirmation is not received. Alternatively, the receiving mobile node may transmit an acknowledgment to the initiating mobile node, and the initiating mobile node transmits the confirmation again if the acknowledgment is not received.

32 Claims, 5 Drawing Sheets

U.S. PATENT DOCUMENTS

2003/0012176 A1 * 1/2003 Kondylis et al. .......... 370/348
2003/0152059 A1 * 8/2003 Odman ...................... 370/338
2003/0152086 A1 * 8/2003 El Batt ....................... 370/400
2003/0193908 A1 * 10/2003 Cain .......................... 370/330
2003/0198206 A1 * 10/2003 Cain et al. ................. 370/337

OTHER PUBLICATIONS

Bao, Lichun, et al; "A new approach to channel access scheduling for Ad Hoc networks"; Jul. 2001; ACM Press; Proceedings of the 7th annual international conference on Mobile computing and networking; pp 210–221.*

Bandyopadhyay, S. et al; "An Adaptive MAC and Directional Routing Protocol for Ad Hoc Wireless Network Using ESPAR Antenna"; ACM Press; Oct. 2001; Proceedings of the 2nd ACM international symposium on Mobile ad hoc networking; pp 243–246.*

Zhu, Chenxi et al; "A Five–Phase Reservation Protocol (FPRP) for Mobile Ad Hoc Networks"; Kluwer Academic Publishers; Aug. 2001; Wireless Networks, vol. 7, Issue 4; pp 371–384.*

* cited by examiner

METHOD AND DEVICE FOR ESTABLISHING COMMUNICATION LINKS AND PROVIDING RELIABLE CONFIRM MESSAGES IN A COMMUNICATION SYSTEM

RELATED APPLICATION

This application is a continuation-in-part of copending application Ser. No. 10/043,457 filed Jan. 10, 2002, the entire disclosure of which is incorporated herein by reference.

This invention was made with Government support under Contract Number N00014-96-C-2063 awarded by the Naval Research Laboratory. The Government has certain rights in this invention.

FIELD OF THE INVENTION

The present invention relates to the field of communications, and more particularly, to a network of mobile communication systems operating with directional antennas.

BACKGROUND OF THE INVENTION

Time division multiple access (TDMA) is one example of an access scheme used for establishing communication links between wireless mobile communication systems. Communication links between the wireless mobile communication systems are established within a series of time frames. Each time frame is divided into time slots, with each wireless mobile communication system being assigned at least one time slot.

An omni-directional antenna is typically used by a wireless mobile communication system so that information transmitted by one mobile communication system is received by all the other mobile communication systems. When the mobile communication systems are operating at a fixed frequency, they must take turns transmitting within their respective time slots to prevent channel interference.

To improve quality of a communications link between two wireless communication systems, a directional antenna may be used. The directional antenna provides an increased antenna gain in a desired area that is limited in coverage while decreasing the antenna gain towards the remaining area.

U.S. Pat. No. 5,767,807 to Pritchett discloses phased array antennas being used for establishing communication links within a network of wireless communication systems. The phased array antenna includes parasitic elements for selectively controlling the antenna pattern. The phased array antenna radiates an omni-directional signal when all of the parasitic elements are in a high impedance state, and radiates a directional signal when a selected number of parasitic elements are placed in a lower impedance state in response to switching circuits.

More particularly, the Pritchett '807 patent discloses the acquisition, by a fixed initiating wireless communication system from a fixed receiving wireless communication system, of a list of the wireless communication systems operating in the network and a corresponding respective time slot list for each wireless communication system. A table is then created based upon the list for scheduling time slots among the wireless communication systems.

Scheduling time slots for wireless communication systems operating with directional antennas, particularly when the wireless communication systems are mobile, is complex. In such a dynamic network, mobile communication systems are continuously entering into and dropping out of the network. Furthermore, reliable confirmation messages are needed.

SUMMARY OF THE INVENTION

It is an object of the present invention to schedule time slots and provide reliable confirmation messages for communication link demands in a wireless mobile ad hoc network.

This and other objects, advantages and features in accordance with the present invention are provided by a wireless communication network including a plurality of mobile nodes each including a transceiver, a directional antenna, e.g. a phased array antenna, connected to the transceiver, and a controller connected to the transceiver. The controller schedules a respective semi-permanent time slot for each time frame to establish a communication link with a neighboring mobile node and leaving at least one available time slot in each time frame, and schedules the at least one available time slot to also serve the communication link with a neighboring mobile node based upon link communications demand. An initiating mobile node transmits a request for time slots to the receiving mobile node, which transmits a reply to the initiating mobile node. The initiating mobile node transmits a confirmation to the receiving mobile node, and the receiving mobile node transmits the reply again if the confirmation is not received. Alternatively, the receiving mobile node may transmit an acknowledgment to the initiating mobile node, and the initiating mobile node transmits the confirmation again if the acknowledgment is not received.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notations are used in alternate embodiments. The dimensions of layers and regions may be exaggerated in the figures for greater clarity.

Figure 1:
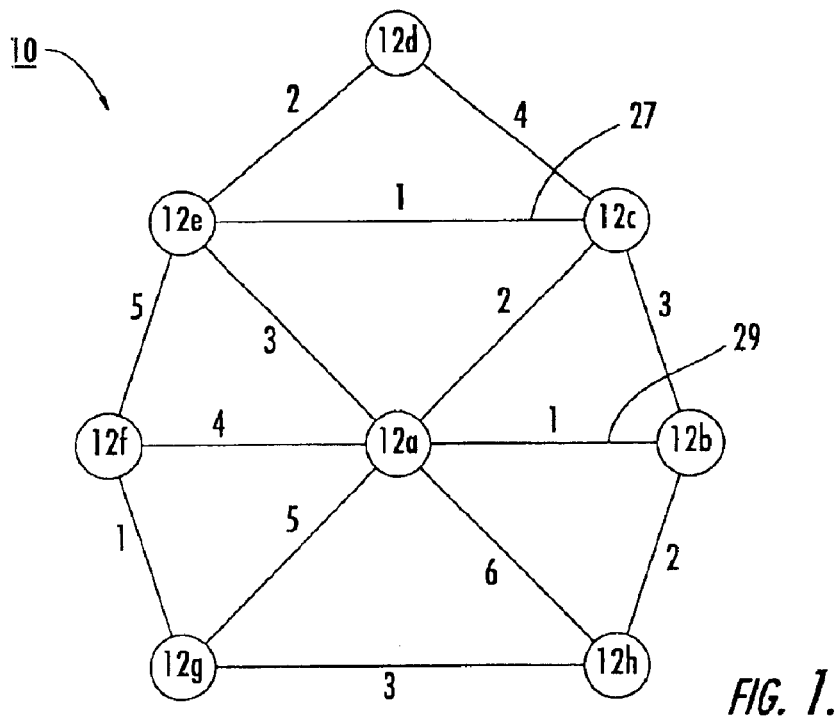
FIG. 1 is a diagram illustrating a wireless mobile ad hoc network in accordance with the present invention.
Figure 2:
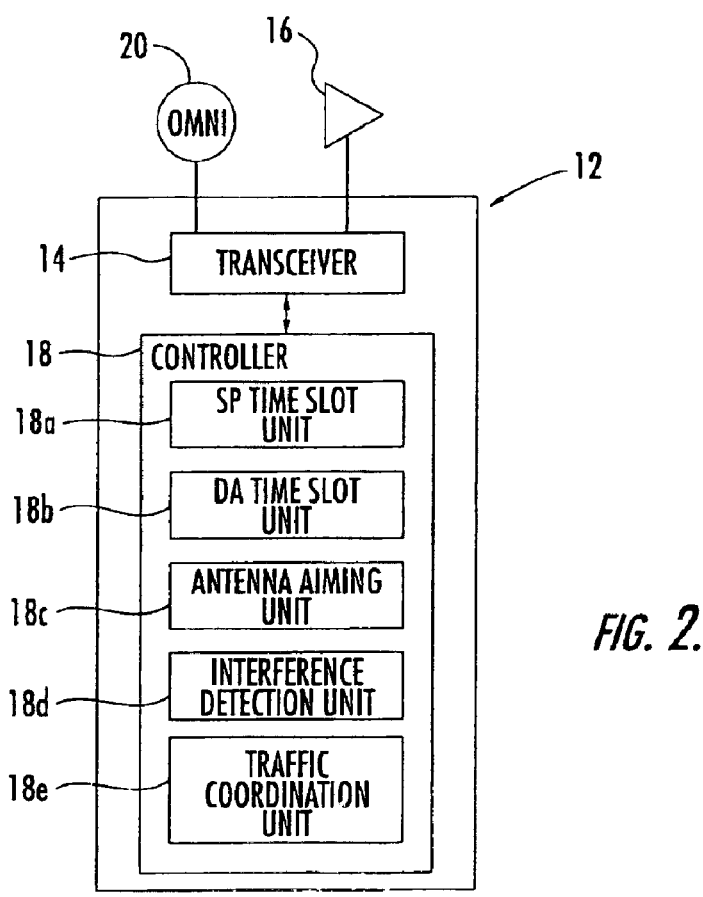
FIG. 2 is a more detailed block diagram illustrating a wireless mobile node in accordance with the present invention.

Referring initially to FIGS. 1–2, a wireless mobile communication network 10 comprises a plurality of wireless mobile nodes 12a–12h. Each mobile node 12a–12h comprises a transceiver 14, a directional antenna 16 connected to the transceiver, and a controller 18 connected to the transceiver.

The controller 18 includes a semi-permanent time slot unit 18a for scheduling a respective semi-permanent time slot for each time frame for establishing a communication link with each neighboring mobile node while leaving at least one available time slot in each time frame. An available time slot unit 18b schedules the at least one available time slot to also serve the communication link with a neighboring mobile node based upon link communications demand. In addition, the controller 18 includes an antenna aiming unit 18c for aiming the directional antenna toward each neighboring mobile node during communication therewith.

Parallel operations can reduce time slot allocation delay. Accordingly, the semi-permanent time slot unit 18a may initiate one or more semi-permanent time slot requests for respective time frames to establish the communication link with each neighboring mobile node and leaving at least one available time slot in each time frame, while processing multiple received semi-permanent time slot requests from neighboring mobile nodes. The available time slot unit 18b may initiate one or more available time slot request to also serve the communication link with the neighboring mobile node based upon link communications demand, while processing multiple received available time slot requests from neighboring mobile nodes.

In other words, a node can have one or more pending demand available requests and semi-permanent requests that it initiated while processing multiple received requests. This may sometimes result in temporarily allocating a given time slot to more than one neighbor. However, this conflict may be eliminated by confirmation messages which indicate the selection of one neighbor node for the time slot, as is discussed in more detail below.

Reliable confirmation messages may be provided with a couple of different approaches. An initiating mobile node transmits a request for time slots to the receiving mobile node, which transmits a reply to the initiating mobile node. The initiating mobile node transmits a confirmation to the receiving mobile node, and the receiving mobile node transmits the reply again if the confirmation is not received. Alternatively, the receiving mobile node may transmit an acknowledgment to the initiating mobile node, and the initiating mobile node transmits the confirmation again if the acknowledgment is not received.

If two nodes simultaneously initiate time slot requests to each other, the time slot request collisions should be handled reliably. The controller 18 waits a time period to resend another request upon simultaneously sending a request to an other mobile node and receiving a request from the other mobile node without receiving a corresponding reply. During this time period, incoming time slot requests may be processed. After the period ends, a new request may be sent to the other node if no request was already received from that node or if no time slot allocation was made to that node. If a delayed request reaches the front of the queue, the controller 18 checks to see if a time slot allocation has already been made to that node. If so, the delayed request is discarded. Also, if the request is destined for a node that is no longer a neighbor by the time the request reaches the front of the queue, the delayed request is discarded.

An interference detection unit 18d is included to detect interference in time slots for communication with neighboring mobile nodes. The controller 18 coordinates the scheduling of time slots based upon detected interference. The interference detection unit 18d may measure a signal-to-interference ratio and/or a packet error rate. The packet error rate may be based upon cyclic redundancy check (CRC) failures. Also, the interference detection unit 18d may compare detected interference to a threshold. Preferably, the controller switches an order of communication between nodes for a given time slot based upon detected interference, and may also coordinate scheduling of new time slots based upon detected interference after switching the order of communication.

A traffic coordination unit 18e coordinates communication with each neighboring mobile node by allocating time slots to the time slot unit based upon link communications demand. The controller 18 coordinates the scheduling of time slots based upon based upon allocated time slots. The traffic coordination unit 18e may allocate a bulk set of time slots based upon an increased link communications demand, and/or may request a bulk set of time slots from neighboring mobile nodes based upon an increased link communications demand. Also, the traffic coordination unit 18e may increase a maximum number of time slots, reallocate time slots, and/or allocate half time slots based upon increased link communications demand. Such increased link communications demand may include streaming video and/or high rate sensor data.

The wireless mobile nodes 12a–12h are operating in a mobile environment. These systems may be ground based and/or airborne, whereby they are continuously entering into and dropping out of the network 10. The directional antenna 16 may be a phased array, a dish or horn antennas, for example. Transmission via a directional antenna 16 enables the RF signal to be focused in a desired direction.

By selectively controlling the direction of the antenna pattern between a pair of wireless mobile communication systems for establishing a communications link therebetween, additional communication links may be established between other wireless communication systems within the same scheduled semi-permanent time slot. This is illustrated by communication link 27 operating in time slot 1 between mobile nodes 12c and 12e, and communication link 29 also operating in time slot 1 between mobile nodes 12a and 12b, as best illustrated in FIG. 1. This feature of the present invention advantageously allows the resources of the wireless mobile communication network 10 to be better utilized.

The controller 18 limits the number of communication links for each wireless mobile node 12a–12h within each time frame based upon a total number of time slots within the frame. The advantage of limiting the number of communication links to a fraction of the total number of time slots within the time frame significantly simplifies the scheduling of time slots with neighboring nodes.

The number of communication links for each wireless mobile node 12a–12h within each time frame is less than or equal to N, and the total number of time slots within each frame is greater than or equal to 2N−1. In addition to simplifying the scheduling of time slots, this type of distributed scheduling avoids conflicts.

Distributed scheduling allows any two pair of wireless mobile nodes, such as 12a and 12b, for example, to schedule a semi-permanent time slot without having to communicate with any other wireless mobile node. In other words, there is no centralized master/slave type of coordination with all of the wireless mobile nodes 12a–12h for scheduling the semi-permanent time slots. Since the time slots among the wireless mobile nodes 12a–12h are scheduled in a distributed fashion, there is no single point of failure in the wireless mobile communication network 10.

The controller 18 may prioritize the communication links and drop one of the communication links based upon the prioritization for making available a semi-permanent time slot for establishing a communication link with a new neighboring mobile node. Prioritization of the communication links will be addressed in greater detail below. In addition, the controller 18 may also prioritize the communication links and schedule the at least one available time slot based upon this prioritization.

The controller 18 may also schedule one of the semi-permanent time slots as an available time slot if a number of the communication links is less than N. This advantageously supports communication link demands on an as needed basis for the existing communication links. However, the controller 18 may reschedule the demand assigned time slot back to a semi-permanent time slot if the number of the communication links is again equal to N, as will also be discussed in greater detail below.

Each communication link is formed by an initiating mobile node, such as node 12a, and a receiving mobile node, such as node 12b, and the initiating mobile node transmits a list of available semi-permanent time slots to the receiving mobile node. The receiving mobile node 12b then transmits selection of one of the semi-permanent time slots to the initiating mobile node. The initiating mobile node 12a then confirms selection of the selected semi-permanent time slot to the receiving mobile node.

Each mobile node may further comprise an omni-directional antenna 20 connected to the transceiver 14 for exchanging positional information with other neighboring mobile nodes. Other information that may be exchanged includes resource requirements and detection of the presence of a potential new neighbor node. In addition, the phased array antenna 16 may simultaneously generate multiple antenna beams, wherein the controller 18 aims the phased array antenna to multiple neighboring mobile nodes within a scheduled semi-permanent time slot.

The interference detection unit 18d detects and avoids interference for collinear node pairs within the beamwidth and allocated the same time slot. For example, referring to FIG. 1, nodes 12a and 12e transmitting to nodes 12b and 12c, respectively during their half of the same assigned time slot 1. With wide enough antenna beamwidths, both nodes 12b and 12c may simultaneously hear transmissions from both nodes 12a and 12e. The interference detection unit 18d may measure the Signal-to-Interference Ratio (SINR) at the physical layer during time slot usage. Alternatively, the packet error rate can be measured at the link layer based upon CRC check failures. If these measurements violate a specified threshold, the slot may be declared bad.

However, because fading may cause a single slot to fail this test, it may be desired to declare excessive interference in a slot if m of n trials of this slot suffer degradation. At this point, the controller 18 attempts to avoid the interference. The order of Tx/Rx at both ends of the link may be switched for the time slot. If such switching fails, a new time slot may be coordinated. Of course both of these changes should be made probabilistically to reduce the likelihood that both node pairs try to make the same change at the same time and thus remain in conflict.

The traffic coordination unit 18e manages unbalanced traffic loads that may be generated by streaming video or high rate sensor data. Coordination mechanisms are provided to permit each half-duplex link to allocate a time slot in any Tx/Rx split of traffic. Also, the maximum number of time slots may be increased to a number above the minimum to create more demand time slots. Subslotting would permit an effective increase or decrease in the maximum number of time slots as nodes may "steal" subslots from a semi-permanent allocated time slot to reallocate to a demand time slot. Moreover, a reservation protocol could be used together with link scheduling procedures to indicate allocation of resources for a high rate stream at each node along a path from a source to a destination node by requesting and allocating a bulk set of time slots and/or subslots at each node along the path to accommodate the high rate stream. For reserved resources, separate queues and a queue service discipline may be necessary to insure that the capacity required by the stream is delivered.

The invention is also directed to a method for establishing communication links for a plurality of mobile nodes 12a–12h, with each mobile node comprising a transceiver 14, a phased array antenna 16 connected to the transceiver, and a controller 18 connected to the transceiver. The method comprises for each mobile node 12a–12h scheduling a respective semi-permanent time slot for each time frame to establish a communication link with a neighboring mobile node and leaving at least one available time slot in each time frame.

The at least one available time slot is preferably scheduled to serve the communication link with a neighboring mobile node based upon link communications demand. The phased array antenna 16 is aimed toward each neighboring mobile node 12a–12h during communication therewith. Each time frame may have up to N semi-permanent time slots and at least 2N−1 available time slots.

The method may also include initiating one or more semi-permanent time slot requests for respective time frames to establish a communication link with each neighboring mobile node and leaving at least one available time slot in each time frame, while processing multiple received semi-permanent time slot requests from neighboring mobile nodes, and initiating at least one available time slot request to also serve the communication link with a neighboring mobile node based upon link communications demand, while processing multiple received available time slot requests from neighboring mobile nodes.

The directional/phased array antenna 16 is aimed toward each neighboring mobile node 12a–12h during communication therewith, interference is detected in time slots for communication with neighboring mobile nodes, and the scheduling of new time slots is coordinated based upon detected interference. The interference detection unit 18d may measure a signal-to-interference ratio and/or a packet error rate. The packet error rate may be based upon cyclic redundancy check (CRC) failures. Also, the interference detection unit 18d may compare detected interference to a threshold. Preferably, the controller 18 switches an order of communication between nodes for a given time slot based upon detected interference, and may also coordinate scheduling of new time slots based upon detected interference after switching the order of communication. Also, communication with each neighboring mobile node 12a–12h may be coordinated by allocating time slots for scheduling based upon link communications demand.

The method further includes having each node prioritize the communication links and drop one of the communication links based upon the prioritization for making available a semi-permanent time slot for establishing a communication link with a new neighboring mobile node. In addition, an available time slot that is currently scheduled to serve a particular communication link may be reassigned to another communication link based on link demand. This advantageously allows any mobile node to accommodate variations in communication link demands.

Scheduling of the semi-permanent time slots and the available time slots will now be discussed in greater detail. Details on steering the directional antennas 16 toward a receiving mobile node 12a–12h will be omitted since this feature of the present invention is readily understood by one skilled in the art.

For purposes of discussion, it will be assumed that the directional antenna 16 is a phased array antenna. As readily understood by one skilled in the art, a phased array antenna 16 includes a plurality of antenna elements and respective phase shifters that can be adjusted for producing a steerable antenna beam in a desired direction. The phased array antenna 16 steers or scans the antenna pattern without physically moving the antenna.

Also for purposes of discussion, a number of assumptions about the wireless mobile communication network 10 are made. First, there is a single frequency band that is a high data rate channel that is shared by all the wireless mobile nodes 12a–12h. This type of transmission channel is time shared between all the wireless mobile nodes 12a–12h for both transmit and receive. All transmission slots are scheduled in advance.

An assumption is also made that a separate low data rate overhead channel is provided. This overhead channel can be used for node discovery, net entry, and exchange of various other data link control overhead information including resource requests. This overhead channel is provided via an omni-directional antenna 20. Good global timing reference is also known at all nodes. The terms wireless mobile nodes and wireless mobile communications systems 12a–12h are interchangeable throughout the following discussion.

The wireless mobile communication network 10 also includes the capability for locating and tracking mobile nodes so that the phased array antennas 16 can be pointed accurately when a scheduled time slot is available. As noted above, a detailed discussion on the pointing/tracking will not be provided herein.

An assumption is also made that the phased array antennas 16 have zero beamwidth. This assumption will be relaxed later. Consequently, we can assume that a transmission by a given mobile node will be received only by the neighbor mobile node to which it is attempting to transmit. This allows a less restrictive set of constraints on the scheduling of time slots. Each communications link will be labeled with a number which represents a scheduled time slot for transmitting and receiving data therein.

The constraints are as follows. No node may have more than one communications link labeled with the same time slot number. A given time slot assignment will apply to a half duplex link between two mobile nodes, and be used alternately by the two nodes for transmit and receive. These two constraints imply that a time slot assigned by a mobile node to one of its neighboring nodes is constrained by the previous time slot assigned by that node to other links.

The scheduling of time slots for the phased array antenna 16 is illustrated in FIG. 1, which shows a network 10 with link connectivity based upon scheduled time slots. The time slots are scheduled so that the wireless mobile nodes 12a–12h know when to point their respective phased array antenna 16 toward a neighboring wireless mobile node.

The communication links are assumed to be bidirectional and are used in a half duplex fashion where each time slot number represents a time slot and a transmission opportunity in each direction occurring in that time slot. The term $N_{frame}$ will be used to denote the maximum link index or the maximum number of time slots within a frame. In the case of this example, $N_{frame}=6$.

Figure 3:
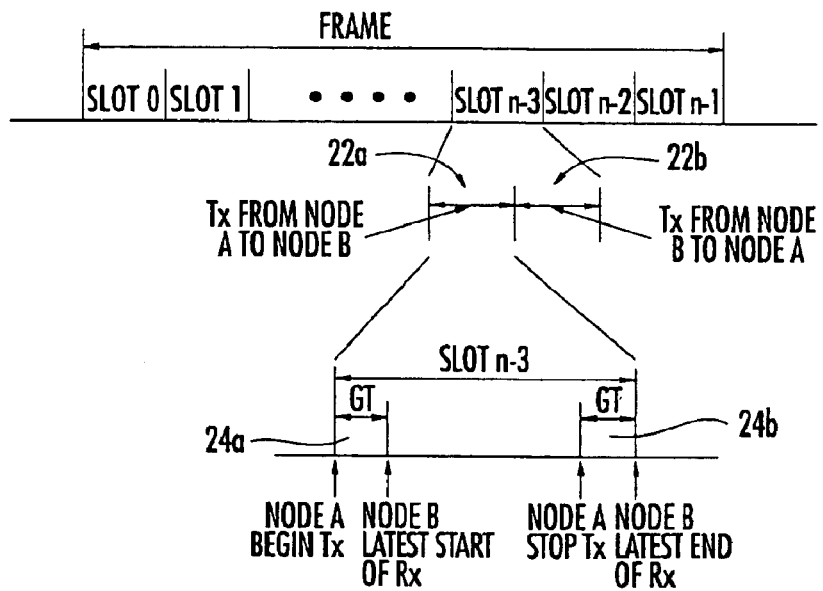
FIG. 3 is a diagram illustrating a frame of time slots in accordance with the present invention.

FIG. 3 illustrates a representative frame of time slots. In the simplest formulation, each epoch or frame has n slots and the value of n is set to $N_{frame}$. In the figure we also show how a time slot is used for the link connecting to nodes labeled as nodes A and B. Each time slot is divided into two mini-slots 22a, 22b. The first mini-slot 22a (e.g., half of the time slot) is used for transmissions from node A to B. Then the direction of the link is reversed and the second mini-slot 22b is used for transmissions from node B to A.

During the transmission periods, multiple packets can be transmitted. As indicated, each mini-slot 22a, 22b also contains a guard time 24a, 24b selected according to the following considerations. The maximum range between any pair of nodes determines the maximum propagation delay that must be accommodated. A maximum range of 100 miles corresponds to about 0.5 ms of propagation delay. A guard time is allocated for each mini-slot 22a, 22b to accommodate uncertainty of propagation delay and unequal propagation delays between all pairs of nodes.

At a maximum range of 100 miles, a guard time of 0.5 ms is needed. The guard time allocation for a maximum range of 100 miles implies the need to make the mini-slots 22a, 22b on the order of 2 to 4 ms to minimize the channel efficiency loss. As an example, if we assume a 50 Mb/s data rate on the communication links and a maximum range of 100 miles, then a 4 ms mini-slot implies 200,000 bits/mini-slot (250 mini-slots per second). Then the mini-slot would contain a 25,000 bit guard time and 175,000 bits of mission data.

The controller 18 may also bias each established link to assign priority when the available time slots are scheduled. As will be discussed in greater detail below, semi-permanent (SP) time slots and available or demand assigned (DA) time slots are provided within each frame. A stated objective is to increase reuse of time slots among several nodes at the same time. While the mobile network 10 in FIG. 1 is limited in the total number of nodes and communication links, there are a number of cases of parallel usage of time slots. For example, time slots 1 and 2 are simultaneously each used on 3 different communication links, and time slot 6 is used on only one link. All the other time slots are assigned to two communication links. We can define a reuse factor which indicates the average level of reuse as a ratio of the total number of time slot assignments in the network ($N_{frame}$) to the number of assigned time slots (Num_Slots_Assigned):

$$R = \frac{\text{Num\_Slots\_Assigned}}{N_{frame}} \quad (1)$$

For the example network 10 in FIG. 1, the reuse approach provides a reuse factor of R=14/6=2.333, indicating that on the average there are slightly more than two simultaneous users of each time slot in the network schedule. It is obvious that the reuse factor calculated for any specific scheduling algorithm will be highly dependent on the network size and topology. A full comparative evaluation should consider a variety of network sizes and topologies.

A lower bound on the value of $N_{frame}$ for any graph can be determined by noting that each node requires at least as many time slots as the node has neighbors, i.e., the node requires a number of time slots at least equal to its degree. Then $N_{frame}$ must be at least as great as the maximum node degree over the entire graph. Thus, denoting the degree of node i by $d_i$ the lower bound on $N_{frame}$ is $$N_{frame} \geq \max_i \{d_i\} \quad (2)$$

Figure 4:
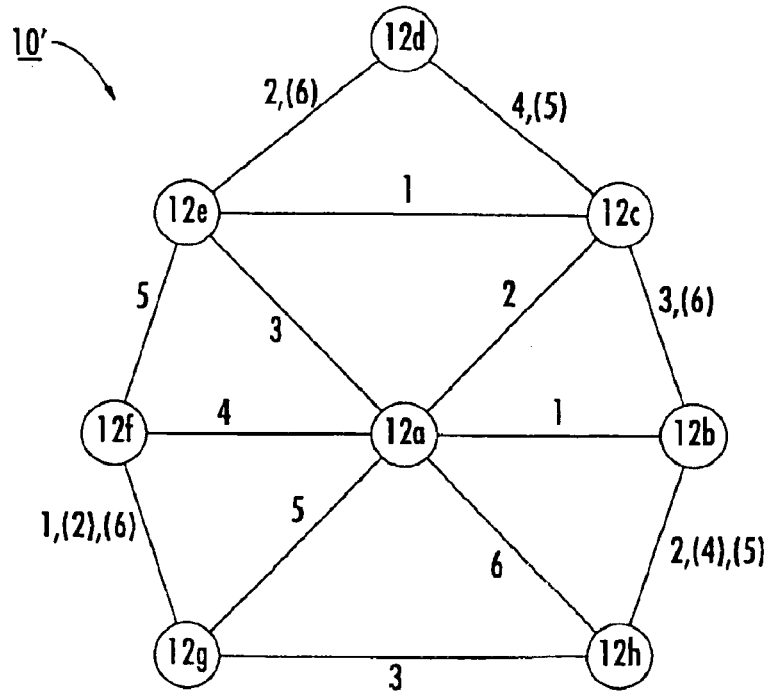
FIG. 4 illustrates the scheduling of available time slots to the network diagram illustrated in FIG. 2 in accordance with the present invention.

For the example network 10 illustrated in FIG. 1 the reuse portion is assigned the scheduling with $N_{frame}$ equal to the minimum number of time slots that must be used according to equation (2). Note that several nodes, namely all nodes but node 12a, are assigned less than the full set of time slot. Thus, an enhanced scheduling algorithm may be able to assign additional slots to some of the links without introducing conflicts in scheduling, as shown in the network 10' of FIG. 4.

The following discussion focuses primarily on the scheduling of time slots for generating the link schedules. Other parts of the overall phased array network problem that ultimately must be addressed include: 1) node and neighbor discovery, 2) net entry, 3) overhead channel format and protocol including protocol exchanges for scheduling updates, and 4) tracking and location of neighbor nodes (may include assistance of phased array antenna 16), and 5) a routing algorithm for a dynamic network topology.

The approach for scheduling time slots according to the present invention is based upon the following principles. First, a specified number of time slots are allocated as semi-permanent (SP) time slots scheduled for a given link. The rest of the available time slots (DA) may be allocated on a demand-assigned basis to those nodes/links that need them most. This allows flexibility in shifting the schedule on an as needed basis. Secondly, as discussed above, a limit on the maximum number of semi-permanently assigned time slots is established. This limit is a parameter that is selected based upon a specific network. This limit is also the upper limit on the number of allowable neighbor nodes, with a single SP time slot per node.

Third, as also discussed above, a limit on the maximum number of time slots per frame is established. This limit is a parameter that is also selected based upon a specific network. This limit is important for establishing a limit on latency since it determines the maximum revisit time for a link transmit opportunity.

Fourth, the relationship between the number of total time slots per frame, $N_{frame}$, and the limit on the maximum number of semi-permanently assigned time slots per frame is chosen so that the scheduling of the semi-permanently assigned time slots is greatly simplified and scheduling conflicts may be significantly avoided even with distributed scheduling.

By limiting the maximum number of semi-permanently assigned time slots per node to a certain fraction to the total number of time slots per frame, the process of distributively assigning semi-permanently assigned time slots is greatly simplified. The upper limit on the number of the semi-permanently assigned time slots (and, therefore, the maximum number of allowable neighbor nodes) will be denoted by N. We will consider values of $N_{frame}$ such that:

$$N_{frame} \geq 2N-1 \quad (3)$$

Assume that all nodes 12a–12h in the network 10 are connected by directional links, where each node has a single beam phased array antenna 16 with beam sharing by time hopping and pointing to its neighbor nodes. Further, assume that the number of neighbors is equal to N, and the limit on the allowable number of semi-permanent time slots (with one SP time slot allocated per neighbor) is fixed.

If the fixed value of $N_{frame}$ satisfies equation (3), then all nodes can select a different semi-permanent time slot for each of these links by mutual agreement with the neighbor for that link without regard to what links other nodes are selecting more than one-hop away. This allows each node to select its semi-permanent time slot for the link to a neighbor node in a very direct fashion by communicating only with that neighbor node. This process can be followed for up to N neighbor nodes.

The key is recognizing that as the value of $N_{frame}$ increases for a fixed value of N, there are fewer constraints on the ability of a node to select a time slot that does not conflict with a neighbor's choice of a time slot. A node selecting a time slot for a new link must select a time slot that it is not currently being used and that the neighbor is not currently using.

If a node currently has m neighbors with a single time slot assigned to each of these links to the neighbors and is adding a link to a new neighbor node, then the neighbor node can be using at most (N−1) time slots. Thus, if $N_{frame}$ is greater than (m+N−1), then there will be at least one more time slot available that the node can assign to the new link. The worst case in this assignment process is when the node already has (N−1) neighbors and is assigning the time slot for the $N^{th}$ neighbor node. In this case $N_{frame}$ must satisfy equation (3) for an additional time slot to be guaranteed to be available for assignment to the link to the $N^{th}$ neighbor.

Some additional observations will be made about how this property can be exploited in the disclosed time slot scheduling approach. First, a node need only coordinate the selection of the semi-permanent time slot to be assigned for a directional link to a neighbor with that neighbor. The node requesting the link might, for example, send to the neighbor the list of suggested time slots for the link. This is based upon those time slots not being used for SP assignments. There could be some ordering of this list based upon other factors to be discussed below, but this is not necessary. The neighbor node can then select from this list the time slot it prefers and return a reply with this selection. This allows us to define a straightforward, fully distributed algorithm for scheduling the semi-permanent time slots.

If a node has less than N neighbors, then more than one of its N allowed semi-permanent time slots could be assigned on individual links. However, in this case there is no guarantee that all N assignments can be made via neighbor-to-neighbor node coordination without some conflicts. For example, if N=6 and a node had only 3 neighbors but each of these neighbors each had 6 neighbors, then the node would be able to assign only one time slot to each of the links with its 3 neighbors. In order to simplify our algorithm, we will not allow scheduling of more than one SP time slot per link. However, all unused time slots may be allocated as available time slots.

For certain networks with very large numbers of nodes where the number of potential neighbors will be much larger than the limit N, there will also be a topology control problem to deal with. The node will be faced with choosing, from among the potential neighbors, those neighbors that create the optimum network topology. This topology control problem also is related to the concept of optimizing an energy efficient network. In the case where the number of potential neighbors is much larger than the limit N, a topology control function can be used to select the neighbor node to connect to.

If we assign to $N_{frame}$ the minimum value allowed by (3), then each node will be allowed to have a maximum of N semi-permanent time slots and a total of (2N−1) time slot assignments. The demand assigned time slots will be assigned on a basis to best accommodate the traffic load. Of course, assigning a much larger value of $N_{frame}$ is also an option. In this case, there will be many more time slots available for demand assignment. There may be applications for which this is a desirable way to configure the network.

As with the semi-permanent time slots, the node need only coordinate the selection of the available time slots to be assigned for a directional link to a neighbor with that neighbor. This means that a neighbor will send a request to the neighbor for the time slot assignment over the directional link, and receive either a grant of the assignment or a denial of the request over the same link.

A node requesting the allocation of an available time slot DA from a neighbor node will do so based upon a perceived need for additional capacity on that link. This may be prompted by a high link utilization (queue buildup) based on short and long term measurements. The request will contain the number of slots requested and a metric, which indicates the priority to be attached to the request. The metric might indicate the queue length as a measure of the need for the time slot allocation.

The node receiving the request may also receive requests from other neighbor nodes, which may contend for allocation of the same time slot. In order to simplify the protocol, a node must complete processing one thread of an available time slot DA allocation before considering the next allocation. These allocations may not persist for a long period of time because they are constantly subject to preemption to become reallocated as semi-permanent time slots as a result of topology changes or subject to reallocation due to shifting traffic demand.

Neighbor and link discovery will now be discussed. The distributed link scheduling algorithm requires support from an omni-directional overhead channel for certain protocol exchanges that must occur with a potential neighbor node prior to the establishment of the directional link with that node. Such messages include the REQ_SPTS which requests the allocation of a semi-permanent time slot on the directional link to that node.

In addition to supporting protocol message exchanges which directly support the protocol defined herein, the omni-directional overhead channel must support the function of neighbor and link discovery. This is usually done through periodic omni transmissions by each node via an omni-directional antenna 20 that alerts any other node that move within range that the two nodes can be neighbor nodes. Several ad hoc routing protocols (including OLSR) have defined such a supporting protocol. These previously defined protocols could be adapted to support this distributed link scheduling algorithm. The primary function that must be performed by such a protocol is to discover new potential neighbor nodes and to report these to the topology control function.

One approach for node and link discovery includes each node periodically transmitting beacon messages over the control channel to notify neighbor nodes of its presence and its position. In addition, link state messages are transmitted periodically to notify neighbor nodes of the identity of its beacon neighbors (BN list) and its PA neighbor nodes (PAN list) and the time slots assigned to these nodes.

The link discovery portion of the algorithm continually compares the bi-directional beacon neighbors (BBN) list with the PAN list to see if there are any nodes on the BBN list that are not on the PAN list. Any such neighbor node becomes a candidate for link testing to determine if a PA link is possible. According to this approach, after an exchange of control messages the directional link is tested to determine if reliable communication is possible. If communication is reliable, the new neighbor node is added to the PAN list.

This validates communication in the testing time slot, but not necessarily in the time slot that may be assigned to the link on a semi-permanent basis. One approach is to do it this way or another approach is to wait until an SP time slot is assigned and test it in this time slot.

The topology control function can be a very straightforward function if it does not have to do topology optimization. The purpose of this function is to take the list of nodes in the PAN list, the information about the reliability of these links, and the information about the network topology, and use this information to determine which nodes on the PAN list should become PA neighbors. This is the function that should optimize the network topology if there are constraints such as the number of PA neighbors that do not allow all nodes in the PAN list to become PA neighbors.

With the proposed constraints of a fixed value for $N_{frame}$ and a fixed value for N (the maximum number of semi-permanent time slots per node), the potential exists for having some concern about network topology utilization. This would certainly be the case if these values were selected to be very small numbers. For example, if N=3 were selected with $N_{frame}$=5, it may be difficult to expect a well connected network topology when we could have no more than 3 neighbors for any node, unless an intelligent topology control function carefully utilized the topology prior to adding new PA neighbor nodes. This may be particularly so for a large network.

Thus, the topology control function should create a neighbor priority (NP) list, which is the PAN list ordered in order of desirability as potential PA neighbors. This list will direct the priority order in which potential PA neighbors are scheduled time slots. However, our initial problem is that of a small network with perhaps 15 nodes. In this case, we could specify N to have a value in the range of 5 to 8 and still have low latency. There is very little likelihood that there will be any topology utilization issues since allowing for 5 to 8 neighbor nodes will allow almost all possible neighbors to be PA neighbors.

A second purpose of the topology control function is to generate the topology change event that causes the link scheduler process to change state and perform the reallocation process for the SP time slots.

A top-level scheduling algorithm structure will now be discussed. The scheduling process was formulated with the objective of minimizing the complexity of the process while taking advantage of the overall approach outlined above. A key to controlling this scheduling is maintaining an accurate data structure at each node reflecting the state of time slot schedules for future time slots assigned to the link with each neighbor node.

Two data structures are proposed: a slot assignment DB and a link message DB. The possible states of links in the data structure for a given time slot in the epoch are listed in TABLE 1. The table describes each possible state and gives the notation for that state. TABLE 2 shows an example slot assignment DA and the contents indicating the timeslots for $N_{frame}=9$ (N=5), the state assignments for each state, and example assigned neighbor IDs for each time slot.

In this example, 4 neighbors have been assigned SP time slots so one additional neighbor may be connected with these constraints. There is one free time slot which may be allocated as a DB time slot or offered with the DB time slots to be allocated as an SP time slot if a new neighbor node is possible. The use of the link message DB will be discussed later in the detailed protocol explanation. The example also indicates the use of sub-slots, e.g., 2 sub-slots per slot.

This is a concept to be used with the DA allocations to allow finer granularity. The meaning in this case would be that an allocation of time slot k, sub-slot 1 would be an allocation to a link of time slot k on the odd numbered frames. Conversely, sub-slot 2 would indicate an allocation of the time slot on the even numbered frames.

TABLE 1

| Time Slot State in DB | Notation |
| --- | --- |
| Free | Free |
| SP Allocated Time Slot | SP_Alloc |
| DA Allocated Time Slot (May Be Preempted by SP Allocation Process or by DA Reallocation) | DA_Alloc |
| SP Allocation Request Message Sent | SP_Req |
| SP Allocation Reply Message Sent | SP_Reply |
| DA Allocation Request Message Sent (May Be Preempted by SP Allocation Process or by DA Reallocation) | DA_Req |
| DA Allocation Reply Message Sent (May Be Preempted by SP Allocation Process or by DA Reallocation) | DA_Reply |

TABLE 2

| Time Slot | Subslot | State | Assigned Neighbor ID |
| --- | --- | --- | --- |
| 1 | — | Free | — |
| 2 | — | SP_Alloc | 3 |
| 3 | — | SP_Req | 4 |
| 4 | 1 | DA_Alloc | 3 |
| 4 | 2 | DA_Alloc | 4 |
| 5 | 1 | DA_Alloc | 5 |
| 5 | 2 | DA_Alloc | 3 |
| 6 | — | SP_Alloc | 5 |
| 7 | 1,2 | DA_Alloc | 8 |
| 8 | 2 | DA_Alloc | 4 |
| 9 | — | SP_Alloc | 8 |

Figure 5:
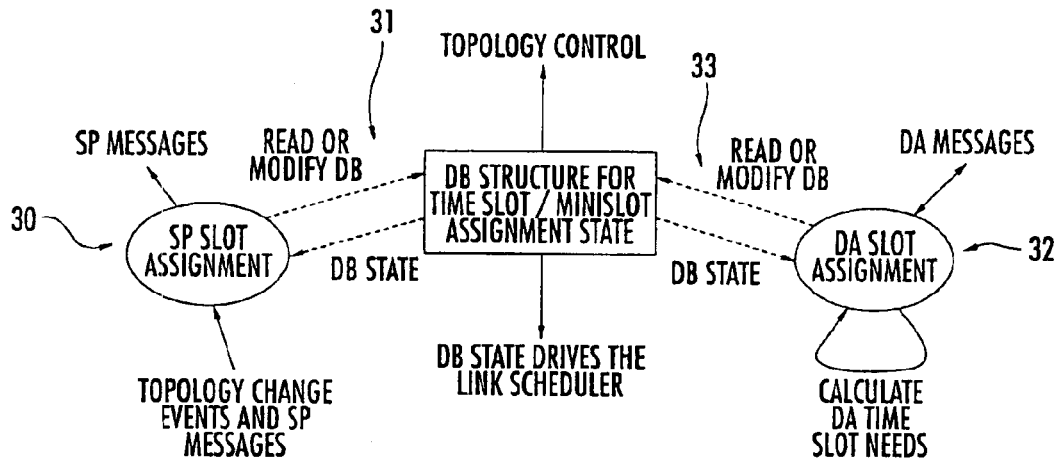
FIG. 5 is a top-level state diagram for the scheduling of semi-permanent time slots and available time slots in accordance with the present invention.

The top-level state diagram for the link scheduling protocol is shown in FIG. 5. The diagram shows two independent processes 30 and 32 that are responsible for maintaining and modifying the time slot allocation database. On the left side is the state diagram for the process for maintaining and assigning semi-permanent (SP) time slots, i.e., process 30. This process has priority over the assignments made by the process 32 on the right, which has responsibility for assigning the available (DA) time slots. Within process path 31, the time slots that can be seized are as follows: free, DA allocated, and in process of being DA allocated. Similarly, within process path 33, the time slots that can be seized are as follows: free, DA allocated and also need to be reallocated.

This database must be controlled as a locked database such that for any given time slot assignment state, only one of the two scheduling processes may modify that state at a given point in time. Once one of the processes begins to modify the state of a particular time slot assignment, the state is locked and the other process may not modify it until it is released.

At any time each time slot in the DB is in one of seven states as indicated in TABLE 1. Available time slots are said to be in the free state, i.e., they are not assigned to a link to one of its neighbor nodes either because a scheduling conflict has prevented assignment or because the time slot has recently become free and has not yet been scheduled.

As indicated, a time slot in the free state may be scheduled either as an SP time slot or a DA time slot. A time slot that has been allocated as SP assigned may be modified only by the process that maintains SP time slots. The time slot may be deallocated by this process if network topology changes or if a more desirable topology is possible. Until such a time slot is returned to the free state, the process for maintaining and assigning the DA time slots cannot modify its state.

In addition, any time slot with a DB state indicating that it is in the process of being SP assigned cannot be allocated by the DA assignment process. This includes states indicating that SP request and reply messages have been sent. However, if the state of a time slot is DA allocated, then it may be reallocated by the DA assignment process. This might be done if the loading on the network indicated that a reallocation of the DA time slot is needed.

In contrast, the process allocating SP time slots has priority. In addition to assigning free slots, it may seize and reassign all time slots that have been DA assigned or are in the process of being DA assigned. This is done to provide a straightforward process of ensuring at least a single SP time slot assigned to each neighbor node during a frame of $N_{frame}$ time slots. SP allocated time slots are returned to the free state only if the link is lost or if the topology control function determines that a particular link should no longer be in the list of the top N links to be established with neighbor nodes.

FIG. 5 illustrates how this process works at the top level. The SP slot assignment process has greater flexibility in allocating time slots. It can seize more time slots for allocation than the DA process, and it can seize time slots that either have been DA allocated or are in the process of being DA allocated. The SP process may receive various events for processing including topology change events from the topology control function and protocol messages.

Such events might include loss of link to a neighbor, discovery of a new neighbor, reception of an SP allocation request message from a neighbor node, and the discovery that a topology change should occur to either add a link to a neighbor, break a link, or do both. The topology change event notification will carry data that will describe the topology change that needs to occur.

If the event described a loss of a link, then the only action that must be taken is to change the appropriate time slot state in the slot assignment DB to "free." If a link is to be added the process is more complex. In this case, the SP slot assignment process initiates protocol message exchanges with the new neighbor node and modifies the slot assignment DB. This ultimately results in the agreement between the two nodes on a time slot assignment for the SP slot assigned to this link. Only a single SP time slot is to be assigned to each link with a neighbor to simplify the protocol. Additional details of this protocol are described below.

The process of assigning DA time slots follows a similar procedure. The DA slot assignment process must calculate the DA time slot needs and compare them with the allocated time slots to determine if a new time slot reallocation is needed. If a reassignment of DA slots is initiated, it will also lead to a series of protocol message exchanges with neighbor nodes to agree on the reassigned time slots. The DA slot assignment process may reassign only time slots that are in the free state or not SP assigned. More about the protocol details and the process for determining when DA time slot reassignment is needed will be discussed below.

Allocating semi-permanent time slots to directional links will now be discussed. In the description of the approach for allocating N semi-permanent time slots assume that N is fixed and intelligently chosen with respect to the network size and environment. Also assume that $N_{frame}=2N-1$. $N_{frame}$ could also be set at any value higher than this to provide additional on-demand time slots if that is deemed to be useful for the particular network and traffic environment.

Several important functions are provided by the topology control function. The neighbor priority (NP) list is generated by the topology control function and is used to indicate the preferred PA neighbor nodes for the assignment of time slots.

If the length of the NP list is N or smaller, then the topology control function will generate topology change events to the SP slot assignment process to make it attempt to get time slot assignments to all of these neighbor nodes. If the length of the NP list is greater than N, then it will generate topology change events to the SP slot assignment process to obtain time slot assignments to each of the N highest priority nodes on the NP list.

The NP list is constantly changing due to network dynamics. When PA links go down, the node is removed from the NP list and the time slot(s) for that link are then subject to reallocation. This is initiated by the topology control function which sends the SP slot assignment process a link delete event. Thus, the SP time slot and any DA time slots allocated to that link become available for reallocation to another node on the PA list.

The first choice when slots become available is to allocate the slot(s) to additional PA neighbor nodes if that is possible given the current state of the NP list. If no additional neighbor nodes can be added, then the slot(s) can be reallocated on a DA basis.

Figure 6:
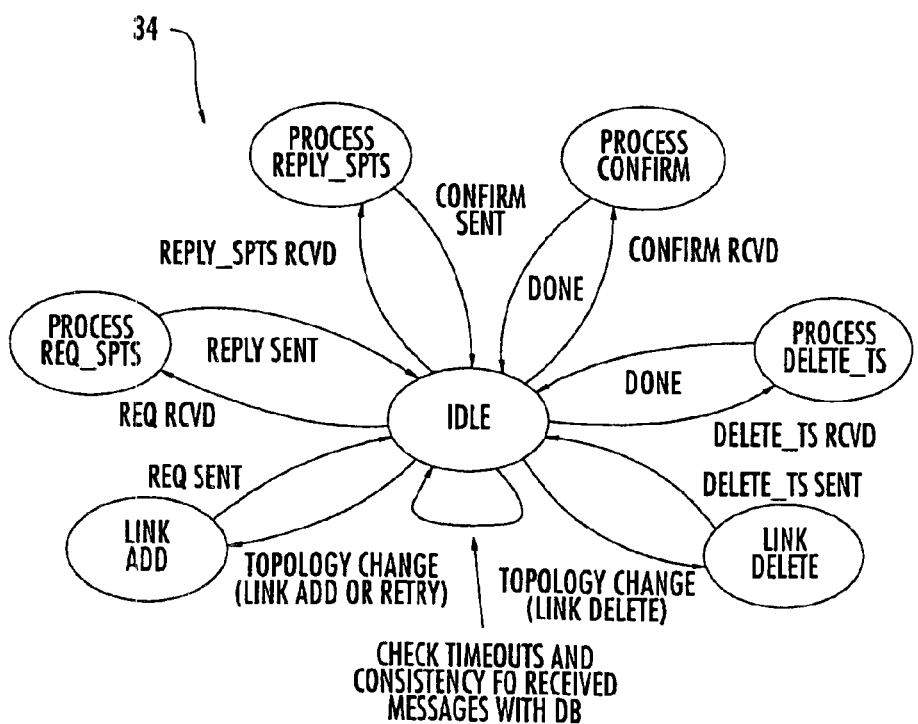
FIG. 6 is a diagram illustrating a semi-permanent time slot scheduling process in accordance with the present invention.

FIG. 6 shows a state diagram of the SP slot assignment process. In order to manage the protocol message processing, a link scheduling message DB is created as shown in TABLE 3. This maintains the state needed from prior protocol exchanges to be used when the needed SP message arrives for processing. The idle process does event management in that it checks received events prior to allowing a state change to one of the other states.

These operations include checking received messages to determine if they are consistent with the current state of the DB. If a message is inconsistent with the DB, it is discarded. Certain timeouts may indicate that DB state needs to be reset. This process performs this function.

TABLE 3

| Nbr_ID | Link State | Time out | Time Slot List | Selected Time Slot | Selected Subslot | Num_tries |
|---|---|---|---|---|---|---|
| 1 | SP_Alloc | — | — | 2 | 1 | — |
| 1 | SP_Alloc | — | — | 2 | 2 | — |
| 1 | DA_Alloc | — | — | 5 | 1 | — |
| 2 | SP_Alloc | — | — | 4 | 1 | — |
| 2 | SP_Alloc | — | — | 4 | 2 | — |
| 2 | DA_Alloc | — | — | 5 | 2 | — |
| 3 | SP_Req | T2 | Ls | — |  | 1 |
| 4 | SP_Alloc | — | — | 6 | 1 | — |
| 4 | SP_Alloc | — | — | 6 | 2 | — |

There are four basic message types required in the SP time slot assignment protocol as listed below in Table 4. The use of these are self-explanatory and tent with the prior discussion.

TABLE 4

| Message Type | Message Function |
|---|---|
| REQ_SPTS | Request New SP Slot Allocation |
| REPLY_SPTS | Reply to Received REQ_SPTS |
| CONFIRM | Response to Received REPLY_SPTS |
| DELETE_TS | Message Indicating Deleted Time Slot Allocation |

Figure 7:
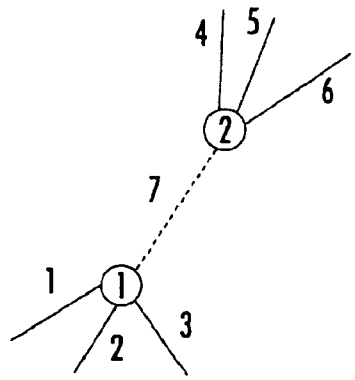
FIG. 7 is a diagram illustrating a semi-permanent time slot being scheduled for a new communication link in accordance with the present invention.

An example of SP time slot assignment is shown in FIG. 7. Nodes 1 and 2 both have 3 neighbors with the SP time slots allocations shown for each link. Therefore, they can add an additional link between themselves. The link scheduling protocol will find an acceptable time slot for the SP allocation. The corresponding protocol message exchange is shown in TABLE 5.

Node 1 initiates the exchange by sending a REQ_SPTS (L=(4,5,6,7)) with a list of at least N candidate time slots. This list may include all free and DA time slots. Node 1 is using slots 1, 2 and 3 for SP allocations to its neighbors so its list L contains the other time slots 4, 5, 6 and 7. When the request message is sent, the appropriate changes are made to the time slot and link scheduling message data structures. Node 2 is using time slots 4, 5 and 6 as SP allocations for its links to its 3 neighbors so it selects time slot 7 as the only one that will work for the new link. It sends this choice in the reply message.

When a reply message is sent, the appropriate changes are also made to the time slot and link scheduling message data structures. Finally, when a confirm is sent or received, the state of the appropriate time slots are changed to "SP allocated to link (1,2)."

Note also that if nodes 1 and 2 had already selected 4 neighbor nodes, it would still be possible for them to find common time slots with which to establish a link between them if they used the same time slots with at least two of their neighbors.

TABLE 5

| Node 1 | | Node 2 |
|---|---|---|
| Receives Link Add Event From Its Topology Control For A Link From Node 1 to Node 2 | | |
| Send REQ_SPTS(L = (4, 5, 6, 7)) | → | Msg Lost |

TABLE 5-continued

| Node 1 | | Node 2 |
|---|---|---|
| Timeout and retry | | |
| Resend | | Rcvd |
| REQ_SPTS(L = (4, 5, 6, 7)) | → | REQ_SPTS(L = (4, 5, 6, 7)) |
| Rcvd REPLY_SPTS(Slot 7) | ← | Send REPLY_SPTS(Slot 7) |
| Send CONFIRM(Slot 7) | → | Rcvd CONFIRM(Slot 7) |
| Slot 7 Allocated to Link (1, 2) | | Slot 7 Allocated to Link (1, 2) |

Some initial pseudocode describing the processes required in FIG. 6 has been developed. There are various events that may occur which must be processed by the SP slot assignment process 34. Event management is done in the idle process as shown in TABLE 6. Four categories of events are shown: received message, check timeouts, link addition notification from topology control, and link failure or link deletion.

Received messages are first checked versus the link scheduling message DB to insure that the message is consistent with the current state of the DB. For example, if we sent a request to a neighbor, the next message expected is a reply. To simplify this distributed protocol, only one thread of SP protocol message exchanges is allowed at a time. This is enforced in the procedure by checking the DB to see if other SP message exchanges are ongoing prior to initiating a link add transition or prior to processing a REQ_SPTS message.

If a link addition cannot be initiated because another SP protocol thread is currently in process, the link addition will be postponed by backing off and rescheduling for a later time when the other process is expected to be completed. Allowing multiple attempts is done to handle potential conflict between several nodes attempting to add links simultaneously. This is not meant to deal with the problem of an unreliable RF link. This latter issue should be addressed by using a link protocol on the overhead channel that uses ARQ and retransmission to recover lost/errored messages.

Thus, the distributed scheduling protocol can assume that messages will not get lost. This allows simplification of the protocol. When topology control selects a neighbor node from the NP list to connect to as a new neighbor, it issues a topology change (link addition) event which (after consistency checks in the idle process) causes a transition to the link add state in the SP slot assignment process.

TABLE 6

Procedure for Idle State (SP Event Management)

```
Case Event Type
    Received Message:
        If received message is not consistent with the
           state of the Link Scheduling Message
           DB for that Nbr_ID
           Discard Message
        Elseif message type = REQ_SPTS
           If no pending SP message activity in the Link
              Scheduling Message DB for link additions
              other than receiving a previous REQ_SPTS
              message from Nbr_ID
              Transition to Process REQ_SPTS state to
              process message
           Else
              Reject new link and send negative
              REPLY_SPTS message to Nbr_ID
```

TABLE 6-continued

Procedure for Idle State (SP Event Management)

```
        End
    Elseif message type = REPLY_SPTS
        Transition to Process REPLY_SPTS state to
        process message
    Elseif message type = CONFIRM
        Transition to Process CONFIRM state to
        process message
    Elseif message type = DELETE_TS
        Transition to Process DELETE_TS state to
        process message
    End
Check Timeouts:
    Check all timeouts
        If Timeout expired for a link in the SP_Req state
           Transition to Link Add State
        If Timeout expired for a link in the SP_Reply
           state
           Reset Slot Assignment DB for time slot Ns and
           in the Link Message state in
           Link Scheduling Message DB for index Nbr_ID
    End
Link Addition Notification from Topology Control:
    If no pending SP message activity in the Link
       Scheduling Message DB
       Transition to Link Add state to add Nbr_ID
    Else
       Backoff and reschedule Link Addition
    End
Link Failure or Link Deletion:
    Transition to Link Delete state to delete link to
    Nbr_ID
    End
End
```

Psuedocode for the link add process is shown in TABLE 7. This starts a process which requires coordination of the SP time slot assignment and protocol message exchanges between only the two neighbor nodes. The node requesting the link sends a REQ_SPTS message to the candidate neighbor node with the list of acceptable time slots for the link.

The list of candidate time slots must contain at least N time slots including at least one semi-permanent time slot SP. The list can also include possibly all of the N−1 available DA time slots. The available or on-demand time slots may be currently temporarily allocated for on-demand traffic. This list will be priority-ordered to indicate the time slot preference that causes the least perturbation in the current available time slot assignments. In other words, the notation being used is that a time slot is not an SP time slot unless already allocated to a communication link. Any of the 2N−1 time slots may be an SP time slot. Thus, the list of N time slots sent are all either free time slots or an available DA time slot. These may be N−1 SP time slots but they are already allocated and are not on the list.

The REQ_SPTS message can be sent up to MAX_TRIES times to allow for unreliable links and conflicts with other assignments potentially occurring simultaneously. The timeout in the link scheduling message DB triggers the retries if there is no REPLY_SPTS message from the neighbor node in response to the REQ_SPTS message. Once the REQ_SPTS message is sent the process returns to the idle state where other events can be processed.

TABLE 7

Procedure for Link Addition to Node Nbr_ID
(Generate REQ_SPTS Message)

```
If Num_tries = MAX_TRIES (No more tries)
    Reset state of Link Scheduling Message DB for index
    Nbr_ID (Link State = Free and no timeout for retry)
    Return to Idle state
Else
    If initial try to node Nbr_ID
        Set Num_tries = 1 in Link Scheduling Message DB
        for index Nbr_ID
    Else
        Set Num_tries = Num_tries +1 in Link Scheduling
        Message DB for index Nbr_ID
    End
    Construct list Ls of time slots to offer to Nbr_ID
    Append list Ls to REQ_SPTS message and send to Nbr_ID
    Setup timeout and Link Message state in Link Scheduling
    Message DB for index
            Nbr_ID and in Slot Assignment DB
    Return to Idle state
End
```

The neighbor receiving a REQ_SPTS message will have its SP slot assignment process transition to the process REQ_SPTS state. The procedure for processing this message is shown in TABLE 8. This procedure takes the offered list of time slots, Ls, and selects its preferred time slot, Ns.

If the number of links to neighbor nodes, Num_links, is less than the limit N, the procedure selects the time slot it prefers from this list. Then a REPLY_SPTS reply message with this selection is sent. If the link cannot be accepted or if there is another ongoing SP slot assignment in process, a negative REPLY_SPTS reply message is sent.

The selected time slot will be selected from one of its N available time slots or one of its free time slots. An available time slot is either a "free" time slot or an available DA time slot. There will be at least N of these if we can add another link. Each node always manages its time slots so that there are N time slots available to assign as semi-permanent time slots (one to each of N neighbor nodes if that many neighbor nodes are available). If it accepts the link, then it will have at most N−1 other neighbor nodes with one semi-permanent time slot allocated per node. The procedure also makes the appropriate modifications to the state in the link scheduling message DB and the slot assignment DB.

TABLE 8

Procedure for Processing REQ_SPTS Message (from Nbr_ID)

```
If Num_links<N
    Examine list Ls of the available time slots received
    from potential neighbor node
        Nbr_ID, compare with the current allocations in
        the Slot Assignment DB, and select the best
        assignment = Ns
    Make appropriate modification to the Slot Assignment DB
    (mark it as SP_Reply) for time slot Ns
    If time slot Ns was DA allocated
        Send DELETE_TS to the neighbor node allocated the
        DA time slot
    End
    Append time slot choice, Ns, to REPLY_SPTS message and
    send to Nbr_ID
    Setup timeout and Link Message state (to SP_Reply with
    time slot Ns) in Link
        Scheduling Message DB for index Nbr_ID
    Return to Idle state
```

TABLE 8-continued

Procedure for Processing REQ_SPTS Message (from Nbr_ID)

```
Else
    Reject new link and send negative REPLY_SPTS message to
    Nbr_ID
    Return to Idle state
End
```

A received REPLY_SPTS message is processed as shown in TABLE 9. The choice of time slot, Ns, received from the neighbor node is extracted from the message. We will also require the node to confirm this reply with either a positive or negative CONFIRM message that indicates that it will agree to use the allocated time slot. This three-way handshake eliminates uncertainty in the outcome of the scheduling process.

If the REPLY_SPTS message is a positive reply, then the choice of time slot, Ns, is examined to see if it is still an allowable assignment for a new SP time slot for the new link. If it is allowable, then the appropriate modifications to the state in the slot assignment and link scheduling message databases are made. Then a positive CONFIRM message is returned.

If the received REPLY_SPTS message was negative, then the slot assignment and link scheduling message databases are reset for this Nbr_ID. Otherwise, if the choice of Ns is no longer allowable, then the link scheduling message database is reset for this Nbr_ID. Then a negative CONFIRM message is sent to the neighbor node rejecting the link.

TABLE 9

Procedure for Processing REPLY_SPTS Message from Nbr_ID

```
Extract time slot choice Ns from the REPLY_SPTS message from
Nbr_ID
If (positive REPLY_SPTS message) and (choice of Ns is still
   allowable from Slot Assignment DB)
    Make appropriate modification to the Slot Assignment DB
    (mark it as SP_Reply)
        for time slot Ns and in the Link Message state in
        Link Scheduling Message DB
        for index Nbr_ID
    If time slot Ns was DA allocated
        Send DELETE_TS to the neighbor node allocated the
        DA time slot
    End
    Create CONFIRM message for Ns and send to Nbr_ID
    Increment Num_links
    Return to Idle state
Elseif negative REPLY_SPTS message
    Reset Slot Assignment DB for time slot Ns and in the
    Link Message state in
        Link Scheduling Message DB for index Nbr_ID
    Return to Idle state
Else
    Reset Link Message state in Link Scheduling Message DB
    for index Nbr_ID
    Send negative CONFIRM message to Nbr_ID
    Return to Idle state
End
```

Table 10 shows the procedure for processing CONFIRM messages. If the CONFIRM is positive, the link is considered to be added to the set of neighbors. The number of links for the node, Num_links, is incremented. The assigned time slot, Ns, is marked SP_Alloc in the slot assignment DB, and the link message state in the link scheduling message DB is reset for index Nbr_ID. If the message was a negative CONFIRM, then the slot assignment and link scheduling message databases are reset for this Nbr_ID.

TABLE 10

Procedure for Processing CONFIRM Message from Nbr_ID

If positive CONFIRM message
    Make appropriate modification to the Slot Assignment DB
    (mark it as SP_Alloc)
        for time slot Ns
    Reset Link Message state in Link Scheduling Message DB
    for index Nbr_ID
    Increment Num_links
    Return to Idle state
Else
    Reset the Slot Assignment DB (mark it as Free) for time
    slot Ns
    Reset Link Message state in Link Scheduling Message DB
    for index Nbr_ID
    Return to Idle state
End An allocated time slot may need to be deallocated for one of several reasons. If during the course of normal operation a link goes down or becomes unreliable, then the topology control function gets involved to address the unreliable link problem. Ultimately, it may generate a topology change (e.g., link deletion) event directing the SP slot assignment process to delete all slots assigned to the link.

The steps involved in this procedure are shown in TABLE 11. The link is de-allocated by sending a DELETE_TS message from the node requesting the de-allocation of all the time slots which are shared with the other node. In addition, the appropriate entries in the link scheduling message DB and the slot assignment DB are reset.

TABLE 11

Procedure for Link Deletion to Node Nbr_ID
(Generate DELETE_TS Message)

Extract list of all SP and DA time slots, Ls, from the Slot
Assignment DB assigned to the
    link to Nbr_ID
Construct message, DELETE_TS, with the list, Ls, and send to
Nbr_ID
Reset Link Scheduling Message DB for index Nbr_ID and Slot
Assignment DB for all time slots in Ls
Decrement Num_links
Return to Idle state Table 12 shows the procedure for processing a received DELETE_TS message. The list of deallocated time slots, Ls, is extracted from the message. Then the appropriate state in the slot assignment DB and in the link scheduling message DB is reset.

TABLE 12

Procedure for Processing DELETE_TS Message from Nbr_ID

Extract list of time slots, Ls, from the DELETE_TS message
from Nbr_ID
Reset the Slot Assignment DB (mark it as Free) for all time
slots in list Ls
Reset Link Message state in Link Scheduling Message DB for
all time slots in list Ls for index Nbr_ID
Decrement Num_links
Return to Idle state In summary, the objective for the function allocating the semi-permanent time slots is to connect to as many neighbor nodes as possible up to N. If N neighbor nodes are obtained, then each is allocated a single semi-permanent time slot. Once a new link is established by this protocol, both nodes will commence operation in the newly allocated SP time slot.

This operation will test the new link to determine if reliable communication can be maintained using the allocated time slot. This insures that there is no unusual interference that occurs in this particular time slot. If the link is tested as unreliable, then the topology control function will be notified so that the time slot can be deallocated and used for other purposes.

Allocation of available (on-demand) time slots will now be discussed. The available time slots are to be allocated in a manner that is responsive to the fluctuating demands of network traffic. Again, assume that N is fixed and intelligently chosen with respect to the network size and environment. Also assume that $N_{frame}=2N-1$.

To allow fine granularity in the allocation of available capacity, time slots will be divided into $m_s$ sub-time slots. Assume for the rest of the following discussion that $m_s=2$. This will be accomplished by defining a sub-time slot to be a specific time slot allocation that repeats every $m_s^{th}$ (or second) frame.

A request for available time slots from one node to a neighbor node is allowed only if at least one semi-permanent time slot is allocated for the link between these two nodes. After a link is allocated at least one semi-permanent time slot, then a node may request a periodic allocation of a single time slot every $m_s^{th}$ (or second) frame. The messages used for scheduling the available time slots can be sent over the PA link for scheduling time slots several frames in advance of when they are needed since the link has an allocation of at least one semi-permanent time slot per frame.

A key requirement for efficient allocation of available time slots is the measurement of the traffic requirements on each link. Two measures will be needed. First, the measured average traffic sent over link (i, k) (in units of the number of time slots per frame) will be denoted by $T_{ikse}$. This measure will include all traffic sent over one or more semi-permanent time slots per frame as well as any available time slots.

In addition, we also need to maintain a current measure of the queue state, $Q_{ik}$, for link (i, k). Larger values of $Q_{ik}$ indicate the need for an immediate allocation of one or more available time slots. Occasional bursts of demand may produce increases in $Q_{ik}$, which should then trigger a request for additional time slots of on-demand capacity until the queue size decreases.

The total number of time slots (quantized to ½ of a time slot with $m_s=2$) allocated on link (i, k) will be denoted by $N_{ik}^{tot}$. The time slot demand is defined as follows:

$$T_{ik}^{dem}=f(T_{ik}^{se},Q_{ik}), \quad (4)$$

which is a function of the measured traffic plus the estimated additional capacity needed that is indicated by the queue size. Then the number of time slots needed on this link, $T_{ik}^{need}$, is as follows:

$$T_{ik}^{need}=\max(T_{ik}^{dem},T_{ik}^{dem}) \quad (5)$$

The metric assigned to this link is as follows:

$$M_{ik}^{DA}=T_{ik}^{need}-N_{ik}^{tot}+B, \quad (6)$$

which is a measure of the estimated number of additional time slots that should be allocated to this link through the DA slot allocation mechanism. B is a bias term that might be nominally set at about ¼ to ½ of a time slot to allocated enough excess capacity to each link to avoid significant queuing. While we are illustrating the approach using the metric defined in (4), a variety of other forms of metric could also be used as the basis for allocating the DA time slots.

Figure 8:
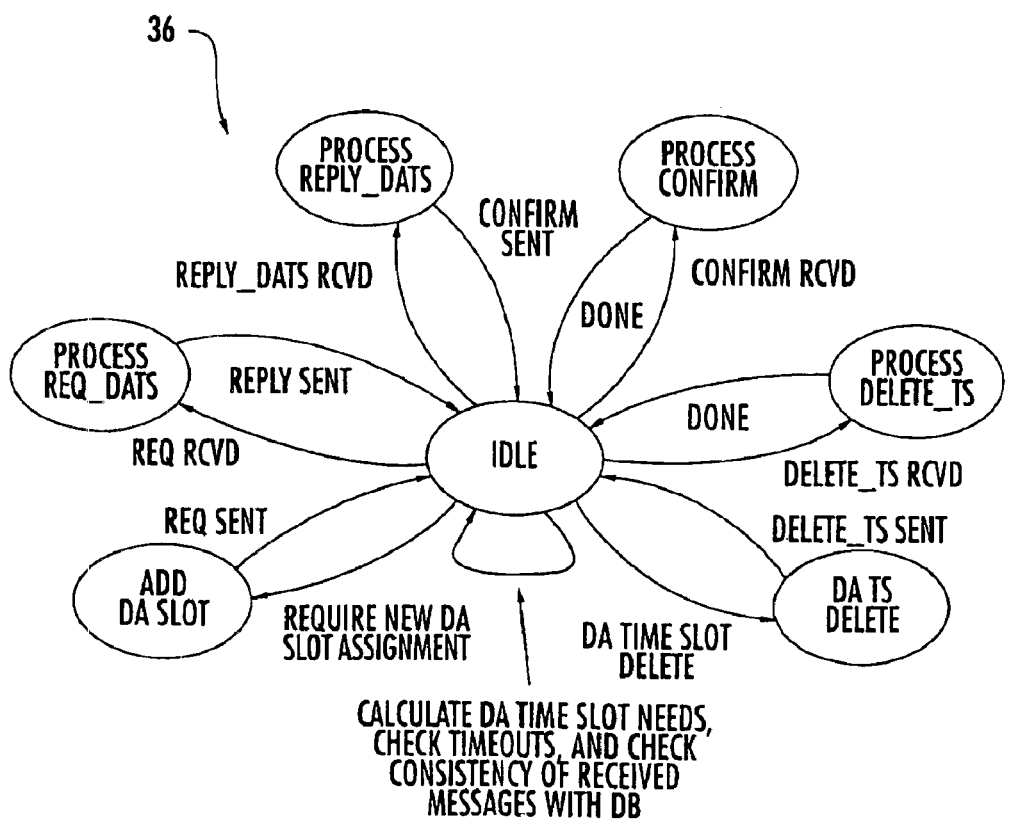
FIG. 8 is a diagram illustrating an available time slot scheduling process in accordance with the present invention.

FIG. 8 shows a state diagram of the DA slot assignment process 36. The state diagram and the protocol exchanges are similar to those of the SP slot assignment process. In order to simplify the protocol message processing, only a single thread of DA time slot allocation can be in process at any time. The idle process does event management in that it checks received events prior to allowing a state change to one of the other states.

These operations include the following. Check received messages to determine if they are consistent with the current state of the DB. If a message is inconsistent with the DB, it is discarded. Certain timeouts may indicate that DB state needs to be reset. This process performs this function. It also determines if the DA slot assignment is optimal given the traffic load needs of the node. It may cause a transition to the add DA slot state if it determines if a new DA time slot must be added to a particular link.

There are four basic message types required in the DA time slot assignment protocol as listed below in TABLE 13. These are very similar to those used in the SP slot allocation. The use of these is self-explanatory and consistent with the prior discussion of the SP slot allocation process.

TABLE 13

| Message Type | Message Function |
| --- | --- |
| REQ_DATS | Request New DA Slot Assignment |
| REPLY_DATS | Reply to Received REQ_DATS |
| CONFIRM | Response to Received REPLY_DATS |
| DELETE_TS | Message Indicating Deleted Time Slot Allocation |
| LINK_METRIC | Message Broadcast to Neighbor Nodes with Link Metric for Each Link to a Neighbor Node |

Figure 9:
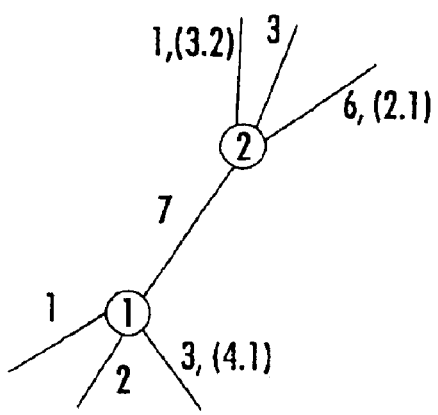
FIG. 9 is a diagram illustrating an available time slot being added to a communications link in accordance with the present invention.

An example of DA time slot assignment is shown in FIG. 9. Node 1 wants to add an additional DA time slot allocation for its link (1,2). The corresponding protocol message exchange is shown in TABLE 5. Node 1 initiates the exchange by sending a REQ_DATS (L=(4.2, 5,6)) indicating that it can support allocations of all of slots 5 and 6 and sub-slot 4.2. This list may include all free and DA time slots, the later of which are less needed.

When the request message is sent, the appropriate changes are made to the time slot and link scheduling message data structures. Node 2 is using time slots 1, 3 and 6 as SP allocations for its links to its 3 neighbors and sub-slots 2.1 and 3.2 as DA allocations. It can select either sub-slot 4.2 or both sub-slots of slot 5. It chooses and sends this choice in the reply message.

When a reply message is sent the appropriate changes are also made to the time slot and link scheduling message data structures. Finally, when a confirm is sent or received, the state of the appropriate time slots are changed to "sub-slot 4.2 DA allocated to link (1,2)."

TABLE 14

| Node 1 | Node 2 |
| --- | --- |
| Determines That The Link From Node 1 to Node 2 Requires An Additional DA Time Slot | |
| Send REQ_DATS(L = (4.2, 5, 6)) | → Msg Lost |
| Timeout and retry | |
| Resend REQ_DATS(L = (4.2, 5, 6)) | → Rcvd REQ_DATS(L = (4.2, 5, 6)) |
| Rcvd REPLY_DATS(Slot | ← Send REPLY_DATS(Slot |

TABLE 14-continued

| Node 1 | Node 2 |
| --- | --- |
| 4.2) | 4.2) |
| Send CONFIRM(Slot 4.2) | → Rcvd CONFIRM(Slot 4.2) |
| Slot 4.2 DA Allocated to Link (1, 2) | Slot 4.2 DA Allocated to Link (1, 2) |

The following approach is used at each network node to allocate the (N−1) available time slots for directional links to neighbor nodes. Using these measures each node will continuously maintain the link metric, $M_{ik}^{DA}$, for each of its links allocated a semi-permanent time slot. Each node will use this link metric to indicate the need for additional transmission time slots to each neighbor node. The largest values of $M_{ik}^{DA}$ indicate the links with the greatest need for additional on-demand time slot allocation. A positive value of $M_{ik}^{DA}$ indicates the number of additional time slots required, and a negative value of indicates the number of time slots that can be surrendered for reallocation.

As the metrics, $M_{ik}^{DA}$, are maintained, if the largest link metric indicates a need for an additional sub-slot allocation and if there are sub-slots available either as free slots or as excess DA allocation to other links (again indicated by a small metric), then the process transitions to the add DA slot state and the process of finding a DA sub-slot allocation is initiated.

As with the semi-permanent time slots, the node need only coordinate the selection of the DA time slot to be assigned for a directional link to a neighbor with that neighbor. This means that a neighbor will send a request to the neighbor for the time slot assignment over the directional link, and receive either a grant of the assignment or a denial of the request over the same link.

Some initial pseudocode describing the processes required in FIG. 8 has been developed. There are various events that may occur which must be processed by the DA slot assignment process. Event management is done in the idle process as shown in TABLE 6.

Four categories of events are shown: 1) received message, 2) check timeouts, 3) recalculation of link metrics, and 4) DA time slot needs and DA time slot deletion. Received messages are first checked versus the link scheduling message DB to insure that the message is consistent with the current state of the DB. For example, if we sent a request to a neighbor, the next message expected is a reply.

To simplify this distributed protocol, only one thread of DA protocol message exchanges is allowed at a time. This is enforced in the procedure by checking the DB to see if other DA message exchanges are ongoing prior to initiating an add DA slot transition or prior to processing a REQ_DATS message. If an addition slot cannot be initiated because another DA protocol thread is currently in process, the addition slot will not be done.

It can be naturally rescheduled on the next opportunity for recalculation of link metrics and DA time slot needs. Link metrics will be recalculated periodically according to a preset schedule. A link which has a link metric greater than a certain threshold, Max_metric_threshold, is a candidate for obtaining a new DA sub-lot.

The link with the maximum metric that exceeds this threshold will be selected as the next link to which a new DA sub-slot is allocated. When a new DA sub-slot needs to be allocated and if it satisfies the above conditions, then a transition to the add DA slot state occurs in the DA slot assignment process.

TABLE 15

Procedure for Idle State (DA Event Management)

```
Case Event Type
    Received Message:
        If received message is not consistent with the
state of the Link Scheduling Message
                DB for that Nbr_ID
                Discard Message
        Elseif message type = REQ_DATS
            If no pending DA message activity in the Link
                Scheduling Message DB for link additions
                other than receiving a previous REQ_DATS
                message from Nbr_ID Transition to Process
                REQ_DATS state to process message
            Else
                Reject new link and send negative
                REPLY_DATS message to Nbr_ID
            End
        Elseif message type = REPLY_DATS
            Transition to Process REPLY_DATS state to
            process message
        Elseif message type = CONFIRM
            Transition to Process CONFIRM state to
            process message
        Elseif message type = DELETE_TS
            Transition to Process DELETE_TS state to
            process message
        End
    Check Timeouts:
        Check all timeouts
        If Timeout expired for a link in the DA_Req state
            Transition to Add DA Slot state
        If Timeout expired for a link in the DA_Reply
        state
            Reset Slot Assignment DB for time slot Ns and
            in the Link Message state in
                Link Scheduling Message DB for index Nbr_ID
        End
    Recalculate Link Metrics and DA Time Slot Needs:
        Recalculate link metrics
        Send new link metrics to all neighbor nodes in a
        LINK_METRIC message
        Sort link metrics and select Largest_link_metric
        If (no pending DA message activity in the Link
                Scheduling Message DB) and
                (Largest_link_metric > Max_metric_threshold)
                    Transition to Add DA Slot state to add new DA
                    slot assignment to Nbr_ID
        End
    DA Time Slot Delete:
        Transition to DA TS Delete state to delete Time
        Slot to Nbr_ID
End
```

Psuedocode for the additional DA slot process is shown in TABLE 16. This starts a process which requires coordination of the time slot assignment and protocol message exchanges between only the two neighbor nodes. The node requesting the link sends a REQ_DATS message to the candidate neighbor node with the list of acceptable time slots for the link.

The list of candidate time slots must contain all free sub-slots and all DA sub-slots with a metric below a certain threshold, Min_metric_threshold. The DA time slots may be currently temporarily allocated for other DA traffic. This list will be priority-ordered to indicate the sub-slot preference that causes the least perturbation in the current on-demand time slot assignments. The priority ordering will be first the free time slots followed by the sub-slots with the smallest metrics progressing up to the largest metric less than the Min_metric_threshold.

In order to simplify this distributed protocol, only one thread of DA protocol message exchanges is allowed at a time. This is enforced in the idle procedure. The REQ_DATS message is only sent once, but it could be unsuccessful if the neighbor node is currently processing another DA protocol exchange. In this case, the node will eventually receive a negative REPLY_DATS message. The attempt to add the DA slot may be made again in this case if this link has the largest metric the next time the link metrics are evaluated. Once the REQ_DATS message is sent the process returns to the idle state where other events can be processed.

TABLE 16

Procedure for Addition of a New DA Subslot to the Link to Node Nbr_ID (Generate REQ_DATS Message)

```
Construct list Ls of time slots (subslots) to offer to
Nbr_ID from Free time slots and
        DA subslots with excess capacity (Link_metric <
Min_metric_threshold)
        Append list Ls to REQ_SPTS message and send to Nbr_ID
        Setup timeout and Link Message state in Link Scheduling
Message DB for index
            Nbr_ID and in Slot Assignment DB
```

The neighbor receiving a REQ_DATS message will have its DA slot assignment process transition to the REQ_SPTS state. The procedure for processing this message is shown in TABLE 17. This procedure takes the offered list of sub-slots, Ls, and selects its preferred sub-slot, Ns. The sub-slot accepted is the first sub-slot on the list, ls, that is either marked free in the slot assignment DB or is DA allocated with a link metric less than Min_metric_threshold. Then a REPLY_DATS reply message with this selection is sent. If the link cannot be accepted or if there is another ongoing DA slot assignment in process, a negative REPLY_DATS reply message is sent. The procedure also makes the appropriate modifications to the state in the link scheduling message DB and the slot assignment DB.

TABLE 17

Procedure for Processing REQ_DATS Message (from Nbr_ID)

```
Examine prioritized list Ls of the available subslots
received from Nbr_ID
        and compare with the current allocations in
        the Slot Assignment DB
    Select the best assignment = Ns as the subslot on the
    list that is either marked Free in
        the Slot Assignment DB or is DA allocated with
        Link_metric <
        Min_metric_threshold
    If no subslot satisfies conditions for acceptance
        Reject new link and send negative REPLY_DATS message to
        Nbr_ID
        Return to Idle state
    Else
        Make appropriate modification to the Slot Assignment DB
        (mark it as DA_Reply)
            for time slot Ns
        If time slot Ns was DA allocated
            Send DELETE_TS to the neighbor node allocated the
            DA time slot
        End
        Append time slot choice, Ns, to REPLY_DATS message and
        send to Nbr_ID
        Setup timeout and Link Message state (to DA_Reply with
        time slot Ns) in Link
            Scheduling Message DB for index Nbr_ID
        Return to Idle state
    End
```

A received REPLY_DATS message is processed as shown in TABLE 18. The choice of sub-slot, Ns, received from the neighbor node is extracted from the message. We require the node to confirm this reply with either a positive or negative CONFIRM message that indicates that it will agree to use the allocated time slot. As indicated in the SP allocation process, this three-way handshake eliminates uncertainty in the outcome of the scheduling process.

If the REPLY_DATS message is a positive reply, then the choice of sub-slot, Ns, is examined to see if it is still an allowable assignment for a new DA sub-slot for the new link. If it is allowable, then the appropriate modifications to the state in the slot assignment and link scheduling message databases are made. Then a positive CONFIRM message is returned.

If the received REPLY_SPTS message was negative, then the slot assignment and link scheduling message databases are reset for this Nbr_ID. Otherwise, if the choice of Ns is no longer allowable, then the link scheduling message database is reset for this Nbr_ID. Then a negative CONFIRM message is sent to the neighbor node rejecting the link.

TABLE 18

Procedure for Processing REPLY_DATS Message from Nbr_ID

Extract time slot choice Ns from the REPLY_DATS message from Nbr_ID
If (positive REPLY_DATS message) and (choice of Ns is still allowable from Slot
    Assignment DB)
    Make appropriate modification to the Slot Assignment DB
    (mark it as DA_Reply)
        for time slot Ns and in the Link Message state in
        Link Scheduling Message DB
        for index Nbr_ID
    If time slot Ns was DA allocated
        Send DELETE_TS to the neighbor node allocated the
        DA time slot
    End
    Create CONFIRM message for Ns and send to Nbr_ID
    Return to Idle state
Elseif negative REPLY_DATS message
    Reset Slot Assignment DB for time slot Ns and in the
    Link Message state in
        Link Scheduling Message DB for index Nbr_ID
    Return to Idle state
Else
    Reset Link Message state in Link Scheduling Message DB
    for index Nbr_ID
    Send negative CONFIRM message to Nbr_ID
    Return to Idle state
End TABLE 19 shows the procedure for processing CONFIRM messages. If the CONFIRM is positive, the selected sub-slot to be added to the allocation to the link to Nbr_ID. The assigned time slot, Ns, is marked DA_Alloc in the slot assignment DB, and the link message state in the link scheduling message DB is reset for index Nbr_ID. If the message was a negative CONFIRM, then the slot assignment and link scheduling message databases are reset for this sub-slot.

TABLE 19

Procedure for Processing CONFIRM Message from Nbr_ID

If positive CONFIRM message
    Make appropriate modification to the Slot Assignment DB
    (mark it as DA_Alloc)
        for time slot Ns
    Reset Link Message state in Link Scheduling Message DB
    for index Nbr_ID
    Return to Idle state
Else
    Reset the Slot Assignment DB (mark it as Free) for time TABLE 19-continued Procedure for Processing CONFIRM Message from Nbr_ID slot Ns
    Reset Link Message state in Link Scheduling Message DB
    for index Nbr_ID
    Return to Idle state
End An allocated time slot may need to be deallocated for one of several reasons. If during the course of normal operation a link goes down or becomes unreliable, then the topology control function gets involved to address the unreliable link problem. Ultimately, it may generate a topology change (e.g., a link deletion) event directing the SP slot assignment process to delete all slots assigned to the link.

The steps involved in this procedure are shown in TABLE 11. The link is de-allocated by sending a DELETE_TS message from the node requesting the de-allocation of all the time slots which are shared with the other node with. In addition, the appropriate entries in the link scheduling message DB and the slot assignment DB are reset.

TABLE 20

Procedure for DA TS Delete to Node Nbr_ID
(Generate DELETE_TS Message)

Construct message, DELETE_TS, containing the DA subslot, Ns,
that is to be deleted
    and send to Nbr_ID
Reset Link Scheduling Message DB for index Nbr_ID and Slot
    Assignment DB for subslot Ns
Return to Idle state Table 21 shows the procedure for processing a received DELETE_TS message. The subslot, Ls, to be deallocated is extracted from the message. Then the appropriate state in the slot assignment DB and in the link scheduling message DB is reset.

TABLE 21

Procedure for Processing DELETE_TS Message from Nbr_ID

Extract DA subslot, Ns, from the DELETE_TS message from
Nbr_ID
Reset the Slot Assignment DB (mark it as Free) for subslot
Ns
Reset Link Message state in Link Scheduling Message DB for
subslot Ns
Return to Idle state The link scheduling algorithm is also applicable to multiple simultaneous beams generated by the phased array antenna 16. Assume the extension to a system with nodes each employing multiple antenna beams with separate receivers such as a multiple beam phased array (or other types of multiple, directional antennas). Furthermore, assume that all nodes do not all have to have the same number of beams, i.e., node k has $B_k$ beams. This is equivalent to $B_k$ parallel links possible at any time slot.

We are extending the previous discussion (which assumed a single steered beam) to allow the $B_k$ beams to be time-shared among a set of neighbor nodes larger than $B_k$. Even though the nodes may each have different numbers of beams, all nodes must use a common time slot format and frame with a number of time slots per frame for each beam equal to $N_{frame}$.

Consider an upper limit at any node k on the number of semi-permanently (SP) assigned time slots on any one of its $B_k$ beams (and therefore the maximum number of allowable neighbor nodes per beam) to be denoted by $N_{beam}$. The value of $N_{beam}$ is dependent only on the number of time slots per frame and not the number of beams. As in (3) we will specify that $N_{beam}$ must satisfy the following equation:

$$N_{frame} \geq 2 \cdot N_{beam} - 1 \qquad (7)$$

Assume that all nodes in a network are connected by directional links, where node k has $B_k$ beams with beam sharing by time hopping and pointing to its neighbor nodes. Further, assume the number of neighbors allowed per beam is equal to $N_{beam}$, the fixed limit on the allowable number of semi-permanent time slots allowed per beam (with one SP time slot allocated per neighbor).

If the fixed value of $N_{beam}$ for each beam at each neighbor node satisfies (7), then all nodes can select a different semi-permanent time slot for each of these links and each of its beams by mutual agreement with the neighbor for that link without regard to what colors other nodes are selecting more than one hop away. This allows each node to select its $N_{beam}$ semi-permanent time slots for each beam in a very direct fashion by communicating only with its neighbor node. By following this strategy, each node is able to support at least $$N_k = B_k \cdot N_{beam} \qquad (8)$$

neighbors and each allocated a single SP time slot with no more than $N_{beam}$ such time slots allocated per beam.

Verification that $N_{beam}$ neighbors per beam can be supported as long as (7) is satisfied follows directly from the verification of the observation for the single beam case. Then if all $B_k$ beams have their SP time slots scheduled in the same fashion, it is obvious that the number of neighbor nodes that can be supported is the product of the number of beams and the number of neighbors per beam resulting in (8).

Figure 10:
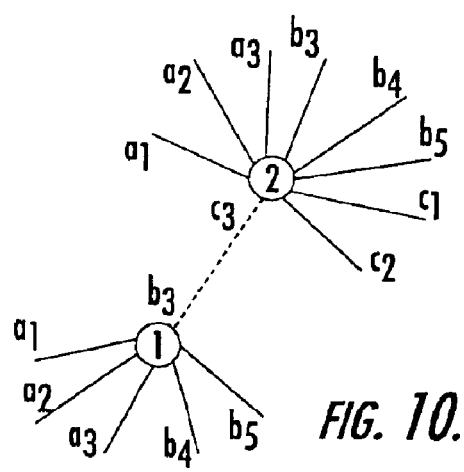
FIGS. 10 and 11 are diagrams illustrating a semi-permanent time slot being scheduled for a new communications link based upon multiple simultaneous antenna beams from a phased array antenna in accordance with the present invention.

An example of SP time slot assignment between two nodes with an unequal number of beams per node is shown in FIG. 10. In this example node 1 has 2 beams and node 2 has 3 beams. While the two nodes have different numbers of beams, both nodes must use the same frame structure. In this example $N_{frame} = 5$ time slots per frame. From (7) and (8), this allows node 1 to have a maximum of 6 neighbors and node 2 to have a maximum of 9 neighbors.

Initially both nodes have one less than the maximum number of neighbors they are allowed under the constraints of (7) and (8). The SP beam/time slots allocations are shown for each link. These nodes can add an additional link between themselves while still satisfying the constraints of (7) and (8). The link scheduling protocol will find an acceptable beam/time slot for the SP allocation for each node, and it operates in essentially the same way it did with the single beam case.

The corresponding protocol message exchange is shown in TABLE 22. Node 1 initiates the exchange by sending a REQ_SPTS(L=(1, 2, 3)) with a list of at least $N_{beam}$ candidate time slots. Note the 3 beam IDs are denoted by a, b and c, and the slot number is denoted by the subscript on the beam ID. Node 1 had to identify that it had used all 3 allowable SP time slots on beam a, but it had allocated only 2 of the 3 allowable SP time slots on its beam b.

Thus, it sent a list of the 3 SP time slots (available on beam b) to node 2. This list may include all free and DA time slots on this beam. When the request message is sent, the appropriate changes are made to the time slot and link scheduling message data structures. Node 2 has previously allocated SP all available SP time slots on beams a and b for its links to its 8 neighbors.

Thus, beam c is the only beam that can accept a new SP allocation. When it receives the REQ_SPTS(L=(1, 2, 3)) from node 1, it selects beam/time slot $c_3$ as the only one that will work for the new link (having previously allocated $c_1$ and $c_2$ as SP time slots). It sends this choice in the reply message. When a reply message is sent the appropriate changes are also made to the beam/time slot and link scheduling message data structures. Finally, when a confirm is sent or received, the state of the appropriate time slots are changed to "SP allocated to link (1,2)."

TABLE 22

| Node 1 | Node 2 |
|---|---|
| Receives Link Add Event From Its Topology Control For A Link From Node 1 to Node 2 | |
| Send REQ_SPTS(L = (1, 2, 3)) → | Rcvd Send REQ_SPTS(L = (1, 2, 3)) |
| Rcvd REPLY_SPTS(Slot 3) ← | Send REPLY_SPTS(Slot 3) |
| Send CONFIRM(Slot 3) → Beam/Slot $b_3$ Allocated to Link (1, 2) | Rcvd CONFIRM(Slot 3) Beam/Slot $c_3$ Allocated to Link (1, 2) |

The changes that are required to implement the multiple beam scheduling algorithm/protocol are straightforward and are as follows. Add the beam ID as a variable in the state of the time slot DB and the link scheduling message DB. Use (7) and (8) as the criteria for determining if it is possible to schedule a new SP time slot. We specify a value for the parameters $N_{frame}$ and $N_{beam}$ for the network.

To offer a new SP time slot to a potential neighbor, the algorithm must first find a beam for which the number of neighbors is less than $N_{beam}$. This beam can then be used to add the new neighbor. The REQ_SPTS message that the node sends to its neighbor will specify $N_{beam}$ available time slots for that beam that are not currently SP allocated.

Having received an REQ_SPTS message the node must find one of its beams for which the number of neighbors is less than $N_{beam}$. This beam can then be used to add the new neighbor. Comparing the list of $N_{beam}$ time slots in the received REQ_SPTS message with the $N_{beam}$ time slots not currently allocated in the selected beam, at least one time slot can be found that is common to both lists. That time slot can be selected as the time slot to send in the REPLY_SPTS message. Once the originating node receives the REPLY_SPTS message, both nodes will have selected their beam and the common time slot allocation.

This example implicitly assumed that a single frequency band is used for each of the beams. In this case, a node could have several beams simultaneously communicating over the same band without interference. This interference-free operation may be difficult to support in practice. A similar formulation of the problem could be done with each beam operating in a different frequency band, i.e., beams a, b, and c in FIG. 10 each use a different frequency band. In terms of the scheduling algorithm, we would apply the same constraints on the allocation of SP time slots. However, in actually allocating the time slot/beam combinations we would need to find an allocation such that the two nodes are using the same beam (equivalent to using the same band) as well as the same time slot. This equivalent to making each beam/time slot combination different from the scheduling perspective. Thus, the number of available time slots is the number of beams multiplied by the frame size. In this case the constraint on assigning SP time slots to potential neighbors is given by $$B \cdot N_{frame} \geq 2 \cdot N - 1, \qquad (9)$$

where B denotes the number of beams. This constraint on the number of neighbors is slightly more restrictive than that of (7) and (8) because of the requirement that nodes which share an SP time slot must also use the same beam/frequency channel as well as the same time slot. For the example $N_{frame}=5$ and B=3, then the constraint of (9) allows 8 neighbors for each node whereas the constraints of (7) and (8) will allow 9 neighbors for each node.

Figure 11:
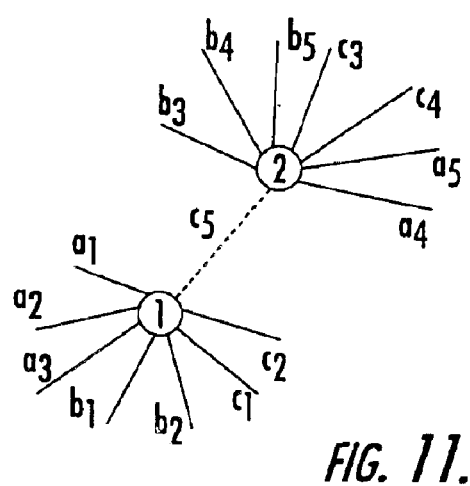

The example problem in FIG. 10 has 2 nodes each with 3 beams with each beam operating in a different frequency band, i.e., beams a, b, and c each use a different frequency band. Assume also that the frame size is 5. Both nodes have already committed 7 SP time slots to neighbor nodes and thus, from (9), they can each add an additional neighbor with an SP time slot allowing them to establish a link between them. The committed SP time slots are indicated in the figure, and the message exchanges required to establish the SP time slot assignment and the new link are indicated in Table 23. The message exchange is initiated by node 1 by sending a REQ_SPTS (L=($a_4$, $a_5$, $b_3$, $b_4$, $b_5$, $c_3$, $c_4$, $c_5$)) message to node 2 which must include the 8 beam/time slot combinations it has not previously allocated as SP time slots. In this example, node 2 had already allocated 7 beam/time slot combinations that were not used by node 1 (which were in the list of 8 beam/time slot combinations received in the REQ_SPTS message). Thus, by (9) there must be at least one remaining beam/time slot combination that it can select for allocation ($c_5$). This is the SP beam/time slot combination allocated to the link between nodes 1 and 2 as show in both FIG. 11 and Table 23.

TABLE 23

| Node 1 | | Node 2 |
| --- | --- | --- |
| Receives Link Add Event From Its Topology Control For A Link From Node 1 to Node 2 | | |
| Send REQ_SPTS(L = ($a_4$, $a_5$, $b_3$, $b_4$, $b_5$, $c_3$, $c_4$, $c_5$)) | → | Rcvd Send REQ_SPTS(L = ($a_4$, $a_5$, $b_3$, $b_4$, $b_5$, $c_3$, $c_4$, $c_5$)) |
| Rcvd REPLY_SPTS (Beam/Slot $c_5$) | ← | Send REPLY_SPTS (Beam/Slot $c_5$) |
| Send CONFIRM (Beam/Slot $c_5$) | → | Rcvd CONFIRM (Beam/Slot $c_5$) |
| Beam/Slot $c_5$ Allocated to Link (1, 2) | | Beam/Slot $c_5$ Allocated to Link (1, 2) |

The present invention thus provides a fully distributed link scheduling algorithm and protocol for phased array networks. The description of the algorithm/protocol details assumed the case of a single directional beam per node, which is time-shared and pointed toward neighbor nodes during the allocated time slot for that access. However, the approach can be used for an arbitrary number of steered beams per node.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A wireless communication network comprising:
   a plurality of mobile nodes for communicating over successive time frames each comprising a plurality of respective time slots of a same type, each mobile node comprising a transceiver, a directional antenna connected to said transceiver, and a controller connected to said transceiver and comprising
      a first time slot unit to schedule at least one respective time slot as a dedicated semi-permanent time slot for said mobile node to establish a communication link with each neighboring mobile node over a plurality of consecutive time frames, and while leaving at least one other time slot as an available time slot in each time frame,
      a second time slot unit to schedule the at least one available time slot to also serve the communication link with a neighboring mobile node based upon link communications demand, and
      an antenna aiming unit to aim said directional antenna toward each neighboring mobile node during communication therewith,
      each communication link being formed by an initiating mobile node and a receiving mobile node, the initiating mobile node transmitting a request for time slots to the receiving mobile node, the receiving mobile node transmitting a reply to the initiating mobile node, the initiating mobile node transmitting a confirmation to the receiving mobile node, and the receiving mobile node transmits the reply again if the confirmation is not received.

2. A wireless communication network according to claim 1, wherein the reply indicates whether the request is accepted by the receiving mobile node.

3. A wireless communication network according to claim 2, wherein the initiating mobile node transmits the request again if the reply is not received after a expiration of a time period.

4. A wireless communication network according to claim 3, wherein the request is only transmitted up to a predetermined number of attempts.

5. A wireless communication network according to claim 1, wherein said controller schedules one of the semi-permanent time slots as an available time slot if a number of the communication links is less than N.

6. A wireless communication network according to claim 5, wherein said controller reschedules the demand assigned time slot back to a semi-permanent time slot if the number of the communication links is to be equal to N.

7. A wireless communication network according to claim 1, wherein a plurality of communication links are established within a scheduled semi-permanent time slot, with each communication link including a different pair of neighboring mobile nodes.

8. A wireless communication network according to claim 1, wherein said directional antenna comprises a phased array antenna.

9. A wireless communication network comprising:
   a plurality of mobile nodes for communicating over successive time frames each comprising a plurality of respective time slots of a same type, each mobile node comprising a transceiver, a directional antenna connected to said transceiver, and a controller connected to said transceiver and comprising
      a first time slot unit to schedule at least one respective time slot as a dedicated semi-permanent time slot for said mobile node to establish a communication link with each neighboring mobile node over a plurality of consecutive time frames, and while leaving at least one other time slot as an available time slot in each time frame, a second time slot unit to schedule the at least one available time slot to also serve the communication link with a neighboring mobile node based upon link communications demand, and an antenna aiming unit to aim said directional antenna toward each neighboring mobile node during communication therewith, each communication link being formed by an initiating mobile node and a receiving mobile node, the initiating mobile node transmitting a request for time slots to the receiving mobile node, the receiving mobile node transmitting a reply to the initiating mobile node upon receiving the request, the initiating mobile node transmitting a confirmation to the receiving mobile node upon receiving the reply, the receiving mobile node transmitting an acknowledgment to the initiating mobile node upon receiving the confirmation, and the initiating mobile node transmitting the confirmation again if the acknowledgment is not received.

10. A wireless communication network according to claim 9, wherein the reply indicates whether the request is accepted by the receiving mobile node.

11. A wireless communication network according to claim 10, wherein the initiating mobile node transmits the request again if the reply is not received after a expiration of a time period.

12. A wireless communication network according to claim 11, wherein the request is only transmitted up to a predetermined number of attempts.

13. A wireless communication network according to claim 9, wherein said controller schedules one of the semi-permanent time slots as an available time slot if a number of the communication links is less than N.

14. A wireless communication network according to claim 13, wherein said controller reschedules the demand assigned time slot back to a semi-permanent time slot if the number of the communication links is to be equal to N.

15. A wireless communication network according to claim 9, wherein a plurality of communication links are established within a scheduled semi-permanent time slot, with each communication link including a different pair of neighboring mobile nodes.

16. A wireless communication network according to claim 9, wherein said directional antenna comprises a phased array antenna.

17. A method for establishing communication links for a plurality of mobile nodes over successive time frames each comprising a plurality of respective time slots of a same type, each mobile node comprising a transceiver, a directional antenna connected to the transceiver, and a controller connected to the transceiver, the method comprising for each mobile node:

scheduling at least one respective time slot as a dedicated semi-permanent time slot for the mobile node to establish a communication link with a neighboring mobile node over a plurality of consecutive time frames, and while leaving at least one other time slot as an available time slot in each time frame;

scheduling the at least one available time slot to also serve the communication link with a neighboring mobile node based upon link communications demand; and aiming the directional antenna toward each neighboring mobile node during communication therewith;

each communication link being formed by an initiating mobile node and a receiving mobile node, the initiating mobile node transmitting a request for time slots to the receiving mobile node, the receiving mobile node transmitting a reply to the initiating mobile node upon receiving the request, the initiating mobile node transmitting a confirmation to the receiving mobile node upon receiving the reply, and the receiving mobile node transmitting the reply again if the confirmation is not received.

18. A method according to claim 17, wherein the reply indicates whether the request is accepted by the receiving mobile node.

19. A method according to claim 18, wherein the initiating mobile node transmits the request again if the reply is not received after a expiration of a time period.

20. A method according to claim 19, wherein the request is only transmitted up to a predetermined number of attempts.

21. A method according to claim 17, wherein one of the semi-permanent time slots is scheduled as an available time slot if a number of the communication links is less than N.

22. A method according to claim 21, wherein the demand assigned time slot is rescheduled back to a semi-permanent time slot if the number of the communication links is to be equal to N.

23. A method according to claim 17, wherein a plurality of communication links are established within a scheduled semi-permanent time slot, with each communication link including a different pair of neighboring mobile nodes.

24. A method according to claim 17, wherein the directional antenna comprises a phased array antenna.

25. A method for establishing communication links for a plurality of mobile nodes over successive time frames each comprising a plurality of respective time slots of a same type, each mobile node comprising a transceiver, a directional antenna connected to the transceiver, and a controller connected to the transceiver, the method comprising for each mobile node:

scheduling at least one respective time slot as a dedicated semi-permanent time slot for the mobile node to establish a communication link with a neighboring mobile node over a plurality of consecutive time frames, and while leaving at least one other time slot as an available time slot in each time frame;

scheduling the at least one available time slot to also serve the communication link with a neighboring mobile node based upon link communications demand; and aiming the directional antenna toward each neighboring mobile node during communication therewith;

each communication link being formed by an initiating mobile node and a receiving mobile node, the initiating mobile node transmitting a request for time slots to the receiving mobile node, the receiving mobile node transmitting a reply to the initiating mobile node upon receiving the request, the initiating mobile node transmitting a confirmation to the receiving mobile node upon receiving the reply, the receiving mobile node transmitting an acknowledgment to the initiating mobile node upon receiving the confirmation, and the initiating mobile node transmitting the confirmation again if the acknowledgment is not received.

26. A method according to claim 25, wherein the reply indicates whether the request is accepted by the receiving mobile node.

27. A method according to claim 26, wherein the initiating mobile node transmits the request again if the reply is not received after a expiration of a time period.

28. A method according to claim 27, wherein the request is only transmitted up to a predetermined number of attempts.

29. A method according to claim 25, wherein one of the semi-permanent time slots is scheduled as an available time slot if a number of the communication links is less than N.

30. A method according to claim 29, wherein the demand assigned time slot is rescheduled back to a semi-permanent time slot if the number of the communication links is to be equal to N.

31. A method according to claim 25, wherein a plurality of communication links are established within a scheduled semi-permanent time slot, with each communication link including a different pair of neighboring mobile nodes.

32. A method according to claim 25, wherein the directional antenna comprises a phased array antenna.

* * * * *